US006625811B1

United States Patent
Kaneko

(10) Patent No.: US 6,625,811 B1
(45) Date of Patent: Sep. 23, 2003

(54) MULTICHANNEL BROADCASTING SYSTEM

(75) Inventor: Shunji Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/064,506

(22) Filed: Apr. 23, 1998

(30) Foreign Application Priority Data

Apr. 25, 1997 (JP) .......................................... P09-108492

(51) Int. Cl.[7] .............................................. H04N 7/173
(52) U.S. Cl. ......................... 725/94; 725/115; 725/145
(58) Field of Search ............................. 725/36, 91, 92, 725/94, 97, 98, 103, 114, 115, 138, 144, 145

(56) References Cited

U.S. PATENT DOCUMENTS

| | | | | |
|---|---|---|---|---|
| 5,341,474 A | * | 8/1994 | Gelman et al. | 709/219 |
| 5,461,415 A | * | 10/1995 | Wolf et al. | 370/432 |
| 5,557,302 A | * | 9/1996 | Levinthal et al. | 345/539 |
| 5,586,264 A | * | 12/1996 | Belknap et al. | 709/219 |
| 5,592,612 A | * | 1/1997 | Birk | 714/6 |
| 5,594,924 A | * | 1/1997 | Ottesen et al. | 710/31 |
| 5,652,916 A | * | 7/1997 | Murakami et al. | 710/52 |
| 5,689,299 A | * | 11/1997 | Isono et al. | 725/115 |
| 5,720,037 A | * | 2/1998 | Biliris et al. | 709/219 |
| 5,761,417 A | * | 6/1998 | Henley et al. | 709/231 |
| 5,764,893 A | * | 6/1998 | Okamoto et al. | 709/213 |
| 5,809,239 A | * | 9/1998 | Dan et al. | 701/104 |
| 5,815,146 A | * | 9/1998 | Youden et al. | 345/720 |
| 5,815,662 A | * | 9/1998 | Ong | 725/92 |
| 5,870,551 A | * | 2/1999 | Ozden et al. | 709/231 |
| 6,072,543 A | * | 6/2000 | Kim | 725/151 |
| 6,124,878 A | * | 9/2000 | Adams et al. | 725/118 |

OTHER PUBLICATIONS

Microsoft Computer Dictionary, Microsoft Press, Fourth Edition, p. 193.*

* cited by examiner

Primary Examiner—Andrew Faile
Assistant Examiner—Jason Salce
(74) Attorney, Agent, or Firm—Jay H. Maioli

(57) ABSTRACT

A system output signals of broadcast contents in a multi-channel broadcasting system without the need to suspend broadcasting even in the event of a failure occurring in an output buffer apparatus, includes a broadcast content storage unit for storing data of the broadcast contents, a plurality of main output buffer apparatuses each assigned to some of several output channels wherein data of broadcast contents to be output to the associated output channels is copied from the broadcast content storage unit to be output at output times as signals, backup output buffer apparatuses fewer in number than the main output buffer apparatuses wherein data of broadcast contents to be output to all the output channels is copied from the broadcast content storage unit, and a control unit for letting the backup output control apparatus output signals of broadcast contents stored therein for output channels associated with any of the main output buffer apparatuses to the output channels in the event of a failure occurring in any of the main output buffer apparatuses.

2 Claims, 22 Drawing Sheets

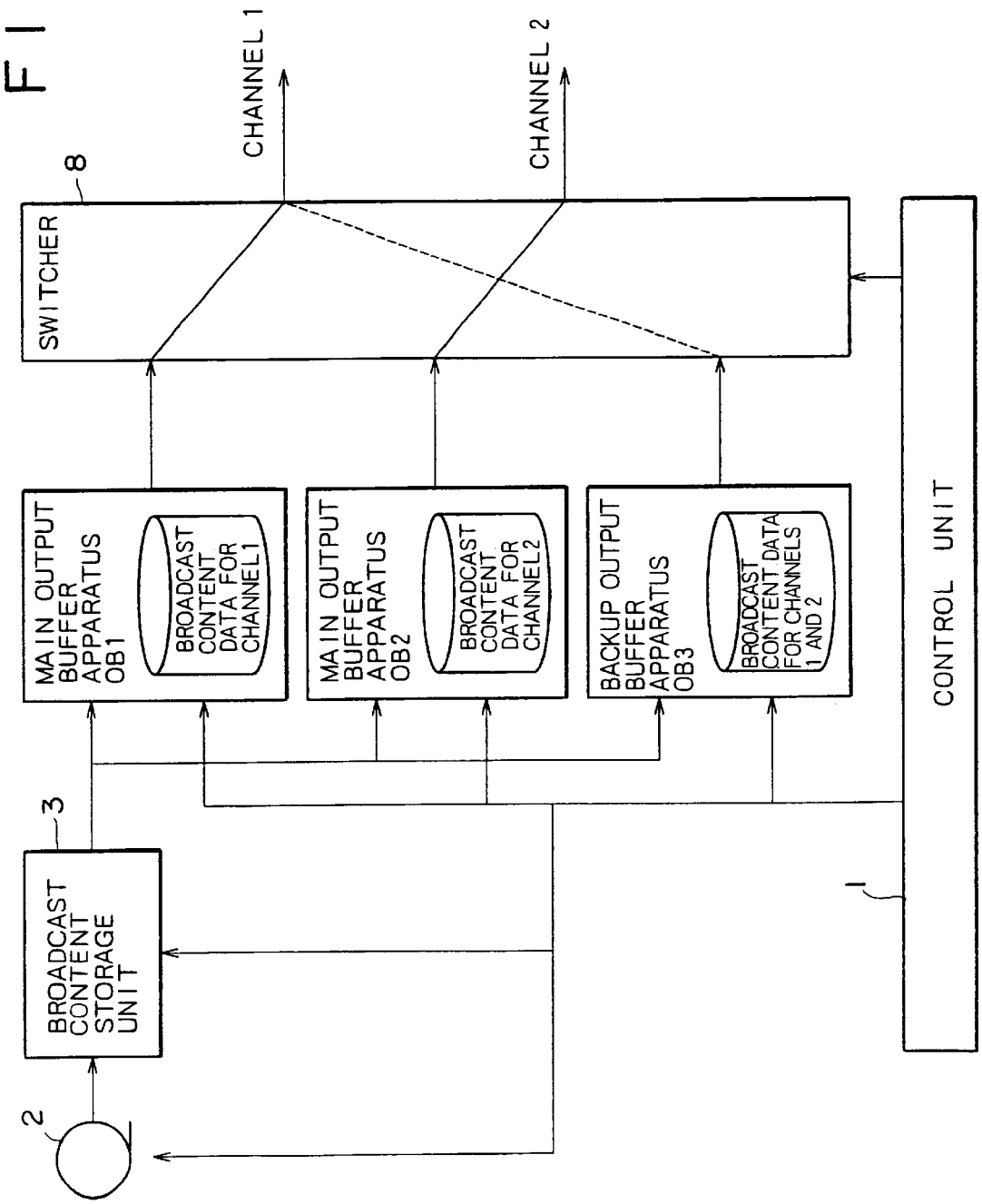

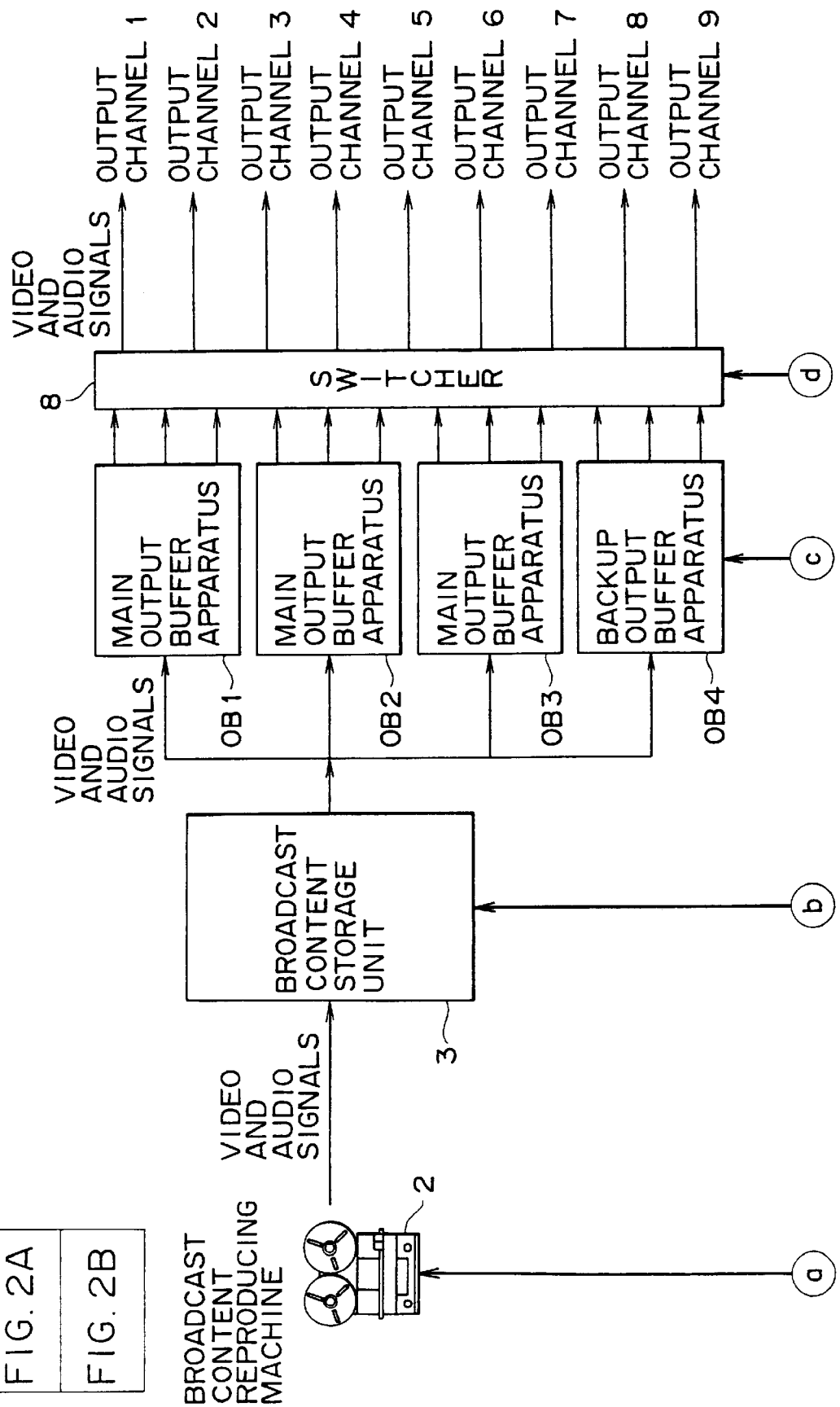

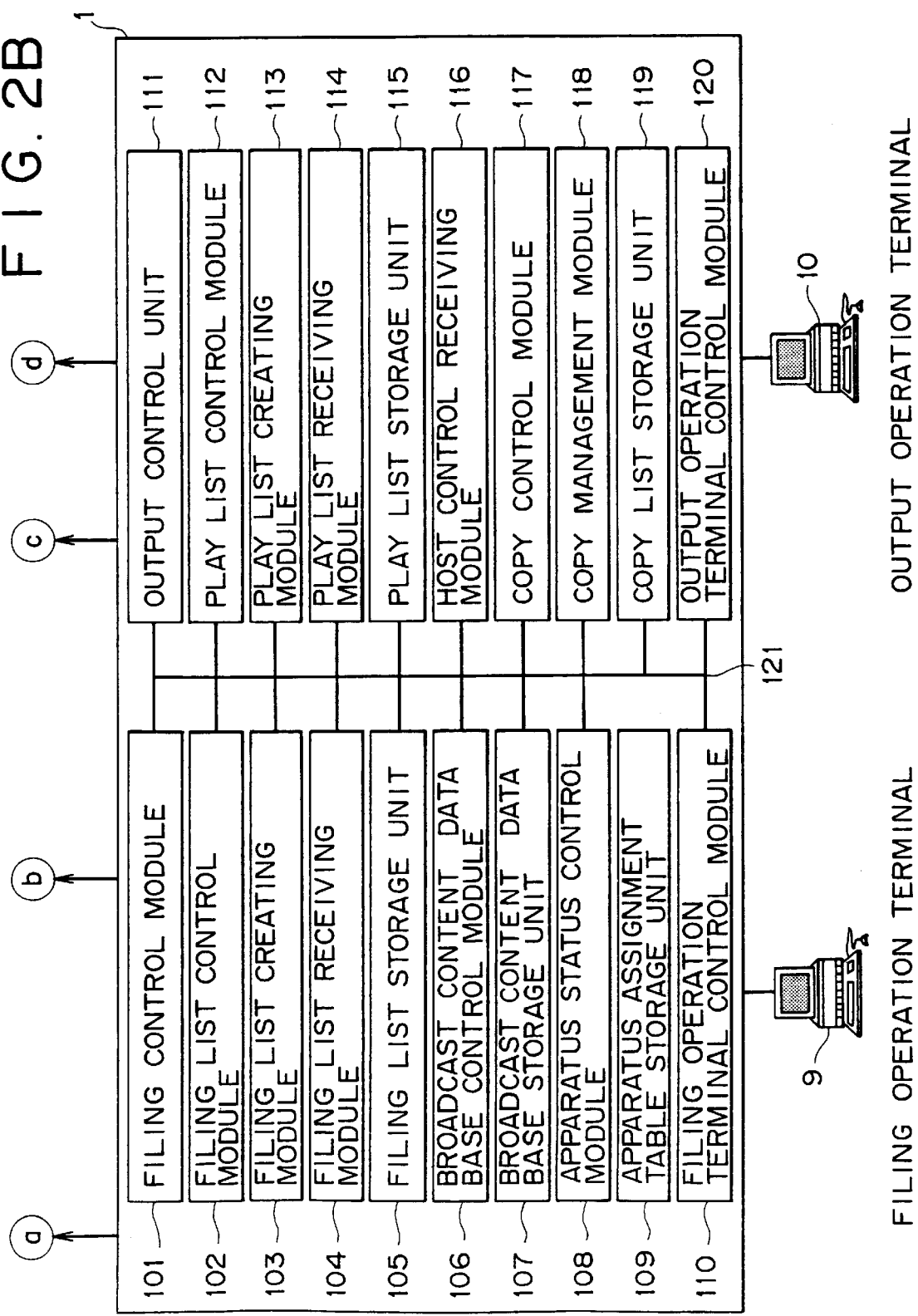

FIG. 6

| BROADCAST CONTENT IDENTIFICATION CODE | BROADCAST CONTENT LENGTH (MIN.:SEC.:FRAMES) | BROADCAST CONTENT NAME | USE PERIOD (YEAR/MONTH/DAY) | SPONSOR | ORIGINAL BROADCAST CONTENT CODE | ORIGINAL BROADCAST CONTENT SOM (HOURS:MIN.:SEC.:FRAMES) |
|---|---|---|---|---|---|---|
| CAR01234 | 00:30:00 | CUTE 96 NEW CARS | 97/01/31 | ABC CORPORATION | T0100123 | 00:00:00:00 |
| AAA31123 | 00:15:00 | BDD TEA | 96/12/31 | ZZ DISTRIBUTOR | T0211111 | 00:00:00:00 |
| SSS00234 | 01:00:00 | WWW CANNED COFFEE | 97/03/31 | GDF CORPORATION | T0200023 | 00:00:00:00 |
| DAS55612 | 00:15:00 | TTT COSMETICS | 97/01/31 | TTR CORPORATION | T0333111 | 00:00:00:00 |
| FTT99231 | 00:15:00 | YY PERSONAL COMPUTER PART1 | 97/01/15 | YY DISTRIBUTOR | T0533333 | 00:00:00:00 |
| FTT99232 | 00:30:00 | YY PERSONAL COMPUTER PART2 | 97/01/15 | YY DISTRIBUTOR | T0533333 | 00:00:30:00 |
| FTT99232 | 01:00:00 | YY PERSONAL COMPUTER PART3 | 97/01/15 | YY DISTRIBUTOR | T0533333 | 00:01:00:00 |
| UUI88123 | 00:30:00 | PP HOUSE | 96/12/31 | PP REAL ESTATES | T8012571 | 00:00:00:00 |

FIG. 7

| BROADCAST CONTENT IDENTIFICATION CODE | BROADCAST CONTENT LENGTH (MIN.:SEC.:FRAMES) | BROADCAST CONTENT NAME | USE PERIOD (YEAR/MON./DAY) | SPONSOR | STATUS |
|---|---|---|---|---|---|
| AR012345 | 00:30:00 | CUTE 96 NEW CARS | 97/01/31 | ABC CORPORATION | FILING COMPLETED |
| AAA31123 | 00:15:00 | BDD TEA | 96/12/31 | ZZ DISTRIBUTOR | FILING COMPLETED |
| SSS00234 | 01:00:00 | WWW CANNED COFFEE | 97/03/31 | GDF CORPORATION | FILING COMPLETED |
| DASS5612 | 00:15:00 | TTT COSMETICS | 97/01/31 | TTR CORPORATION | FILING COMPLETED |
| FTT99231 | 00:15:00 | YY PERSONAL COMPUTER PART I | 97/01/15 | YY DISTRIBUTOR | RECORDING COMPLETED |
| FTT99232 | 00:30:00 | YY PERSONAL COMPUTER PART II | 97/01/15 | YY DISTRIBUTOR | FILING COMPLETED |
| FTT99232 | 01:00:00 | YY PERSONAL COMPUTER PART III | 97/01/15 | YY DISTRIBUTOR | RECORDING COMPLETED |
| UUI88123 | 00:30:00 | PP HOUSE | 96/12/31 | PP REAL ESTATES | RECORDING COMPLETED |

| OUTPUT BUFFER APPARATUS NO. | EXISTENCE OF A BROADCAST CONTENT | FILE NAME | COMPLETED OUTPUT FLAG | USE FREQUENCY LEVEL | FINAL OUTPUTTING TIME (YEAR/MON./DAY HOURS:MIN.:SEC.) |
|---|---|---|---|---|---|
| OABUF1 | YES | AR012345-1 | OFF | 3 | 96/11/08 08:00:00 |
| OABUF2 | YES | AR012345-2 | OFF | 5 | 96/11/14 17:00:00 |
| OABUF3 | YES | AR012345-3 | ON | 4 | 96/11/14 15:30:00 |

| OUTPUT BUFFER APPARATUS NO. | EXISTENCE OF A BROADCAST CONTENT | FILE NAME | COMPLETED OUTPUT FLAG | USE FREQUENCY LEVEL | FINAL OUTPUTTING TIME (YEAR/MON./DAY HOURS:MIN.:SEC.) |
|---|---|---|---|---|---|
| OABUF1 | NO | AAA31123-1 | OFF | 2 | 96/11/08 08:00:00 |
| OABUF2 | YES | AAA31123-2 | OFF | 2 | 96/10/26 21:00:00 |
| OABUF3 | NO | AAA31123-3 | OFF | 1 | 96/11/14 15:30:00 |

| OUTPUT BUFFER APPARATUS NO. | EXISTENCE OF A BROADCAST CONTENT | FILE NAME | COMPLETED OUTPUT FLAG | USE FREQUENCY LEVEL | FINAL OUTPUTTING TIME (YEAR/MON./DAY HOURS:MIN.:SEC.) |
|---|---|---|---|---|---|
| OABUF1 | NO | SSS00234-1 | OFF | 3 | 96/11/08 08:00:00 |
| OABUF2 | YES | SSS00234-2 | OFF | 2 | 96/10/26 21:00:00 |
| OABUF3 | NO | SSS00234-3 | ON | 3 | 96/11/14 15:30:00 |

FIG. 8

| OUTPUTTING DATA AND TIME (YEAR/MONTH/DAY HOURS:MINUTES:SECONDS) | PROGRAM IDENTIFICATION CODE | TITLE | OUTPUT TIME LENGTH (HOURS:MINUTES:SECONDS:FRAMES) | BROADCAST CONTENT IDENTIFICATION CODE |
|---|---|---|---|---|
| 96/11/20 08:00:00 | CB20-800000R | SBCM FRAME 1-BDD TEA | 00:00:15:00 | AAA31123 |
| 96/11/20 08:00:15 | CB20-800015R | SBCM FRAME 1-GWR NEW CARS | 00:00:15:00 | AAS44672 |
| 96/11/20 08:00:30 | CB20-800030R | SBCM FRAME1-TTT COSMETICS | 00:00:15:00 | DAS55612 |
| 96/11/20 08:00:45 | CB20-800045R | SBCM FRAME 1-YY PERSONAL COMPUTER | 00:00:15:00 | FTT99231 |
| 96/11/20 08:01:00 | CB20-800100R | PROGRAM-GOOD MORNING THAT TOWN PART 1 | 00:14:00:00 | PB208001 |
| 96/11/20 08:15:00 | CB20-801500R | PRESENTATION CM FRAME 1-CUTE 96 | 00:00:30:00 | CAR01234 |
| 96/11/20 08:15:30 | CB20-801530R | RRESENTATION CM FRAME 1-YY PERSONAL COMPUTERS | 00:00:30:00 | FTT99232 |
| 96/11/20 08:16:00 | CB20-801600R | PROGRAM-GOOD MORNING THAT TOWN PART 2 | 00:14:00:00 | PB208002 |

FIG. 9

| BROADCAST CONTENT IDENTIFICATION CODE | BROADCAST CONTENT NAME | OUTPUT CHANNEL | OUTPUTING DATA AND TIME (YEAR/MON./DAY HOURS:MIN.:SEC.) | OUTPUT BUFFER APPARATUS NO. |
|---|---|---|---|---|
| AAA31123 | BDD TEA | CHANNEL1 | 96/11/20 08:00:00 | OABUF1 |
| DAS55612 | TTT COSMETICS | CHANNEL1 | 96/11/20 08:00:30 | OABUF1 |
| FTT99231 | YY PERSONAL COMPUTERS PART1 | CHANNEL1 | 96/11/20 08:00:45 | OABUF1 |
| FTT99232 | YY PERSONAL COMPUTERS PART2 | CHANNEL1 | 96/11/20 08:15:30 | OABUF1 |
| YYP87771 | TGF CAMERA | CHANNEL1 | 96/11/20 08:30:00 | OABUF1 |
| FFP33675 | ADE CANNED COCA COLA | CHANNEL1 | 96/11/20 08:30:30 | OABUF1 |
| FFP33675 | PP GENTLEMAN CLOTHS | CHANNEL1 | 96/11/20 08:45:00 | OABUF1 |

FIG. 10

| OUTPUT CHANNEL | MAIN OUTPUT BUFFER APPARATUS NO. | BACKUP OUTPUT BUFFER APPARATUS NO. | FAILURE FLAG |
|---|---|---|---|
| CHANNEL 1 | OABUF1 | OABUF4 | OFF |
| CHANNEL 2 | OABUF1 | OABUF4 | OFF |
| CHANNEL 3 | OABUF1 | OABUF4 | OFF |
| CHANNEL 4 | OABUF2 | OABUF4 | OFF |
| CHANNEL 5 | OABUF2 | OABUF4 | OFF |
| CHANNEL 6 | OABUF2 | OABUF4 | OFF |
| CHANNEL 7 | OABUF3 | OABUF4 | OFF |
| CHANNEL 8 | OABUF3 | OABUF4 | OFF |
| CHANNEL 9 | OABUF3 | OABUF4 | OFF |

FIG. II

| OUTPUT CHANNEL | MAIN OUTPUT BUFFER APPARATUS | | | BACKUP OUTPUT BUFFER APPARATUS | | |
|---|---|---|---|---|---|---|
| | NO. | CAPACITY | SIZE OF USED AREAS | NO. | CAPACITY | SIZE OF USED AREAS |
| CHANNEL 1 | OABUF1 | 1 HOUR | 30 MINUTES | OABUF4 | 20 MINUTES | 15 MINUTES |
| CHANNEL 2 | OABUF1 | 1 HOUR | 42 MINUTES | OABUF4 | 20 MINUTES | 14 MINUTES |
| CHANNEL 3 | OABUF1 | 1 HOUR | 51 MINUTES | OABUF4 | 20 MINUTES | 17 MINUTES |
| CHANNEL 4 | OABUF2 | 1 HOUR | 45 MINUTES | OABUF4 | 20 MINUTES | 19 MINUTES |
| CHANNEL 5 | OABUF2 | 1 HOUR | 53 MINUTES | OABUF4 | 20 MINUTES | 12 MINUTES |
| CHANNEL 6 | OABUF2 | 1 HOUR | 20 MINUTES | OABUF4 | 20 MINUTES | 9 MINUTES |
| CHANNEL 7 | OABUF3 | 1 HOUR | 39 MINUTES | OABUF4 | 20 MINUTES | 18 MINUTES |
| CHANNEL 8 | OABUF3 | 1 HOUR | 17 MINUTES | OABUF4 | 20 MINUTES | 17 MINUTES |
| CHANNEL 9 | OABUF3 | 1 HOUR | 54 MINUTES | OABUF4 | 20 MINUTES | 8 MINUTES |

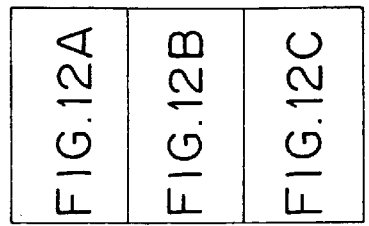
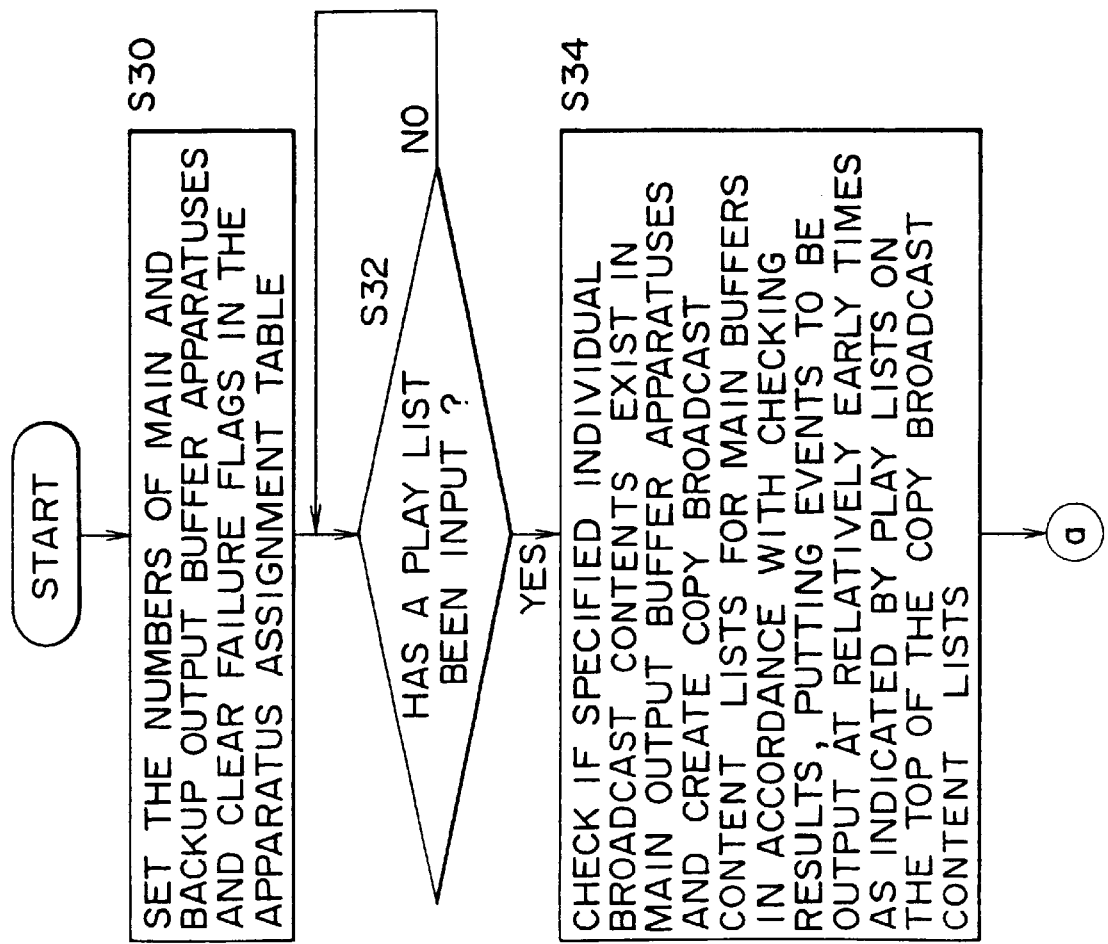
FIG. 12A

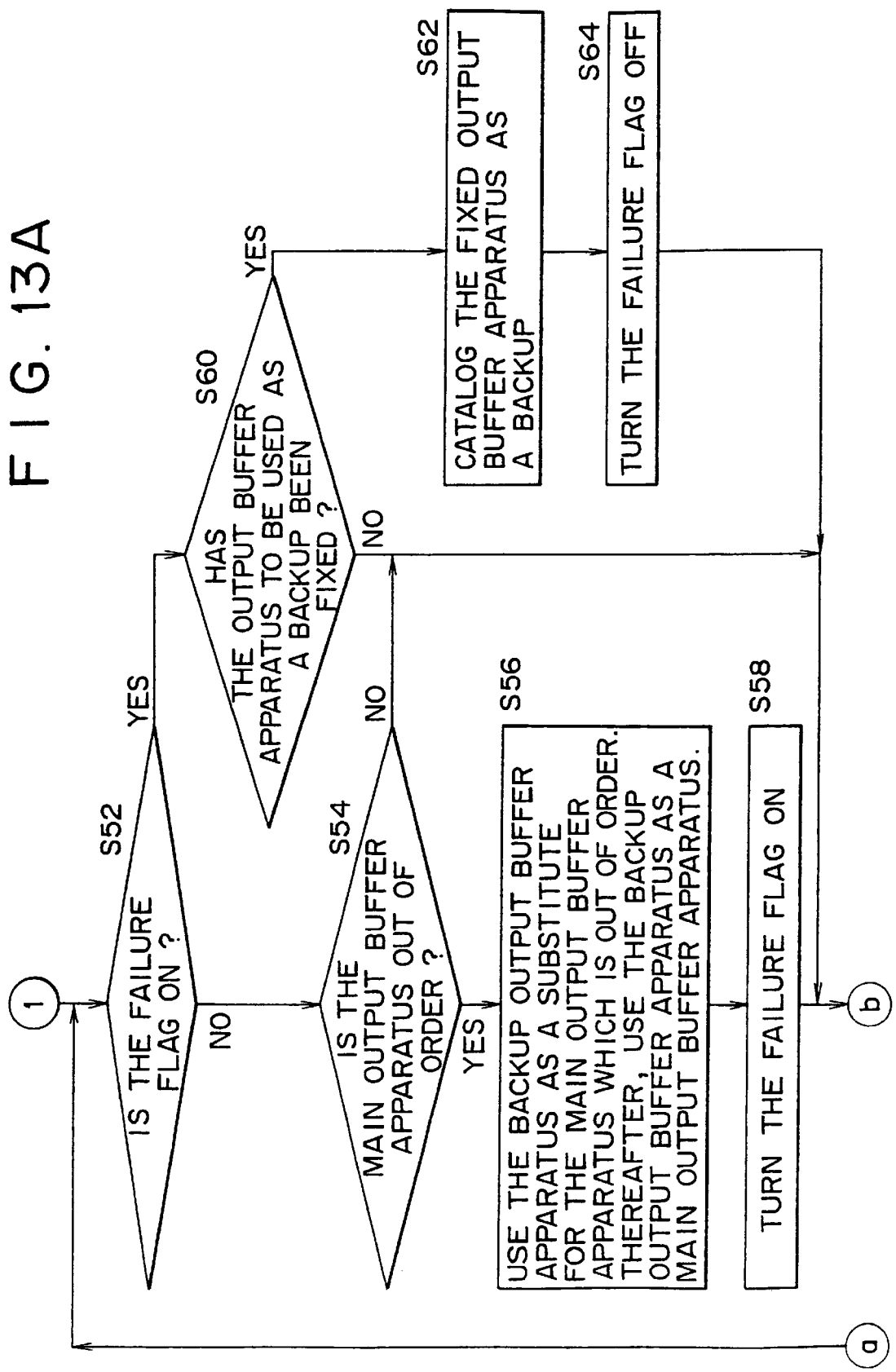

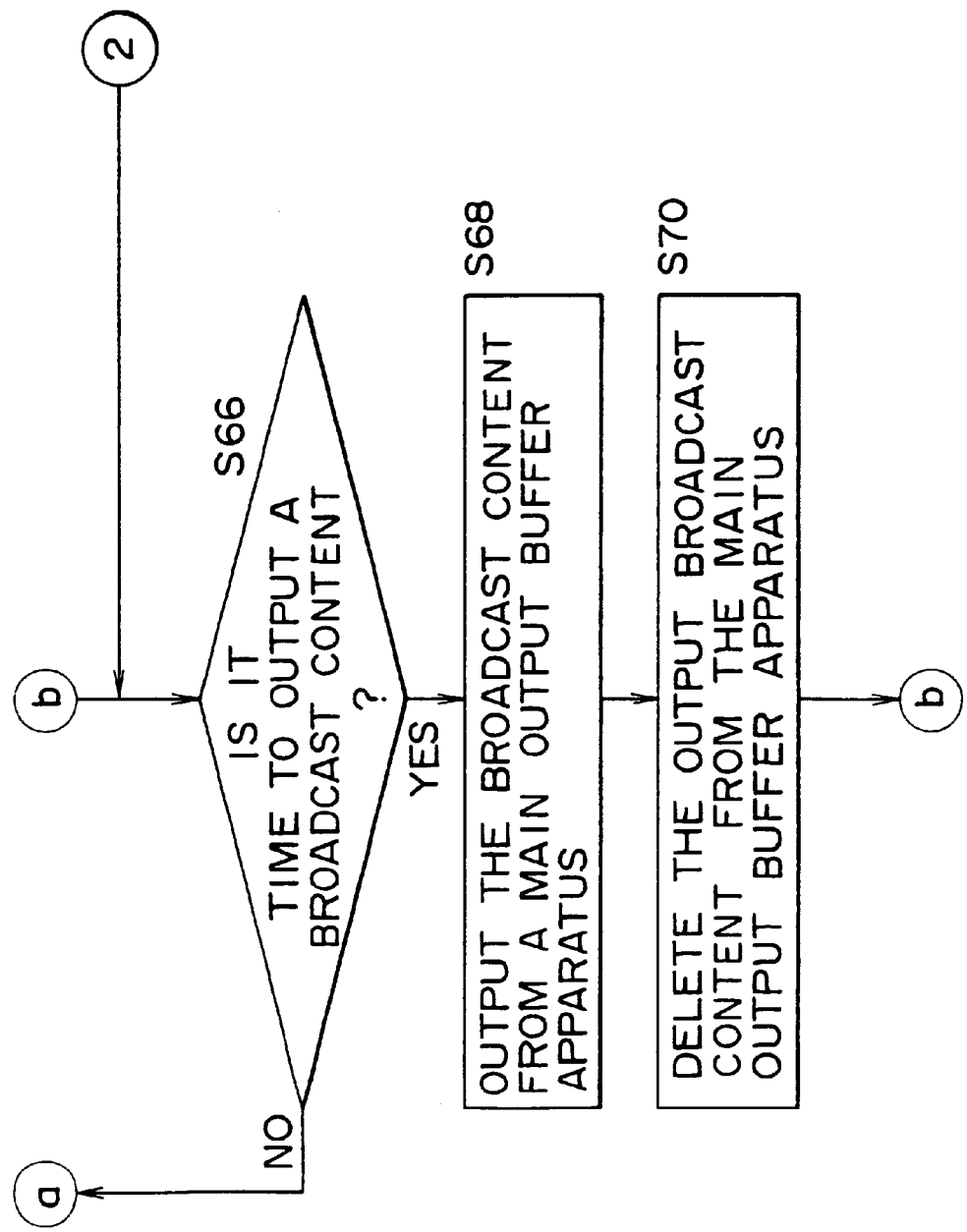

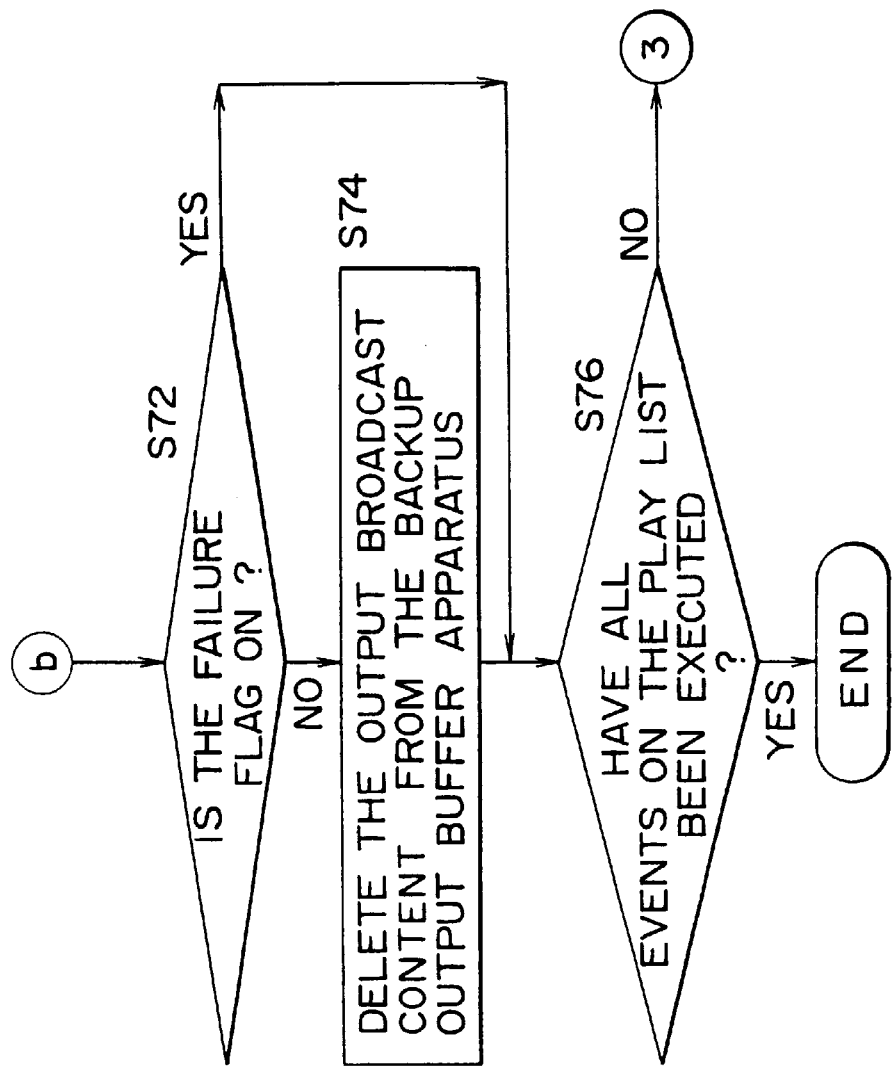
FIG. 13C
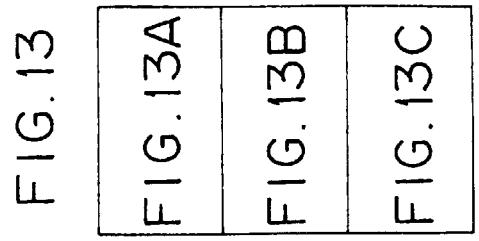

FIG. 14

| OUTPUT CHANNEL | MAIN OUTPUT BUFFER APPARATUS NO. | BACKUP OUTPUT BUFFER APPARATUS NO. | FAILURE FLAG |
|---|---|---|---|
| CHANNEL 1 | OABUF4 | — | ON |
| CHANNEL 2 | OABUF4 | — | ON |
| CHANNEL 3 | OABUF4 | — | ON |
| CHANNEL 4 | OABUF2 | — | ON |
| CHANNEL 5 | OABUF2 | — | ON |
| CHANNEL 6 | OABUF2 | — | ON |
| CHANNEL 7 | OABUF3 | — | ON |
| CHANNEL 8 | OABUF3 | — | ON |
| CHANNEL 9 | OABUF3 | — | ON |

F I G. 15

| OUTPUT CHANNEL | MAIN OUTPUT BUFFER APPARATUS | | | BACKUP OUTPUT BUFFER APPARATUS | | |
|---|---|---|---|---|---|---|
| | NO. | CAPACITY | SIZE OF USED AREAS | NO. | CAPACITY | SIZE OF USED AREAS |
| CHANNEL 1 | OABUF4 | 1 HOUR | 15 MINUTES | — | — | — |
| CHANNEL 2 | OABUF4 | 1 HOUR | 14 MINUTES | — | — | — |
| CHANNEL 3 | OABUF4 | 1 HOUR | 17 MINUTES | — | — | — |
| CHANNEL 4 | OABUF2 | 1 HOUR | 45 MINUTES | — | — | — |
| CHANNEL 5 | OABUF2 | 1 HOUR | 53 MINUTES | — | — | — |
| CHANNEL 6 | OABUF2 | 1 HOUR | 20 MINUTES | — | — | — |
| CHANNEL 7 | OABUF3 | 1 HOUR | 39 MINUTES | — | — | — |
| CHANNEL 8 | OABUF3 | 1 HOUR | 17 MINUTES | — | — | — |
| CHANNEL 9 | OABUF3 | 1 HOUR | 54 MINUTES | — | — | — |

MULTICHANNEL BROADCASTING SYSTEM

BACKGROUND OF THE INVENTION

In general, the present invention relates to a multichannel broadcasting system. More particularly, the present invention relates to a broadcasting system wherein system reliability is improved by providing a backup output buffer apparatus to a plurality of output buffer apparatuses each provided for some output channels.

In recent years, much attention is paid to multichannel broadcasting using a satellite or communication cables. The multichannel broadcasting is different from single channel broadcasting using the ordinary and traditional ground wave in that, in the case of the former, one broadcasting station broadcasts different programs to a number of channels. Thus, in a broadcasting station, it is necessary to transmit a program along with advertisements inserted into the program, commercials and an advertisement for the program to each channel. It should be noted that a commercial is referred to hereafter simply as a CM.

In general, a program requires a long transmission time while a CM or a program advertisement has a short period in the range 15 to 30 seconds. However, there are a number of CM or advertisement types. Moreover, the same CMs and advertisements are broadcasted repeatedly from time to time.

For the above reason, in an ordinary broadcasting system, short broadcast contents such as CMs are entered temporarily in a storage apparatus to be transmitted later at appropriate times in accordance with a play list created separately for transmission use. Prepared for each channel, a play list is a list of broadcast contents to be output to the channel. A play list which differs from channel to channel is used for transmitting CMs and other short broadcast contents for the respective channel.

However, transmission of short CMs and other short broadcast contents of many types to a number of channels accompanying the migration to multichannel broadcasting entails extremely complicated work. As a solution to this problem, there has been proposed a broadcasting system wherein an output buffer apparatus is provided for each channel or each group of channels for storing data of broadcast contents such as CMs to be transmitted to the channel or the channels in the group. The data stored in the output buffer apparatus is signals such as images, sound and characters. By providing a plurality of output buffer apparatuses, the work to transmit broadcast contents to a plurality of channels can be made simpler.

When a failure occurs in an output buffer apparatus, however, the transmission of CMs and other broadcast contents is suspended till the apparatus gets fixed. It is thus necessary to provide a backup output buffer apparatus. Since the multichannel broadcasting system itself is still at a stage of development, nevertheless, a useful proposal as to how a backup output buffer apparatus should be configured has not been made yet.

SUMMARY OF THE INVENTION

It is thus an object of the present invention to provide a multichannel broadcasting system having a low cost backup output buffer apparatus capable of properly coping with a failure occurring in an output buffer apparatus.

It is another object of the present invention to provide a multichannel broadcasting system having a simply configured and highly reliable backup output buffer apparatus capable of properly coping with a failure occurring in an output buffer apparatus.

In order to solve the problems described above, the present invention provides a multichannel broadcasting system for transmitting signals representing broadcast contents to a plurality of output channels. The multichannel broadcasting system comprises:

(1) a broadcast content storage apparatus for storing a plurality of broadcast content signals;
(2) a plurality of main output buffer apparatuses each provided for some of the output channels wherein signals representing broadcast contents to be transmitted to the associated output channels are copied from the broadcast content storage apparatus thereto for transmission at transmission times; and
(3) a plurality of backup output buffer apparatuses fewer in number than the main output buffer apparatuses wherein signals representing broadcast contents to be transmitted to all the output channels are copied from the broadcast content storage apparatus thereto.

When one of the main output buffer apparatuses employed in the multichannel broadcasting system provided by the present invention is out of order, signals representing broadcast contents for output channels associated with the broken apparatus are transmitted to the output channels from the backup output buffer apparatus.

According to the present invention, a plurality of backup output buffer apparatuses fewer in number than the main output buffer apparatuses each capable of storing copies of signals representing broadcast contents for more output channels than the output channels associated with one main output buffer apparatuses. Thus, in the event of a failure occurring in any of the main output buffer apparatuses, the transmission of a signal representing broadcast contents can be continued by transmitting the signal from a backup output buffer apparatus without suspension of the broadcasting through the use of few hardware resources.

BRIEF DESCRIPTION OF THE DRAWINGS

Embodiments of the present invention have been described by referring to the accompanying diagrams wherein:

FIG. 1 is a diagram showing the configuration of an embodiment implementing a multichannel broadcasting system provided by the present invention in a simple and plain manner;

FIGS. 2A and 2B are diagrams showing the overall configuration of a multichannel broadcasting system as implemented by another embodiment of the present invention;

FIG. 6 is a diagram showing a table representing an example of a filing list in concrete terms;

FIG. 7 is a diagram showing tables representing an example of a broadcast content data base in concrete terms;

FIG. 8 is a diagram showing a table representing an example of a play list;

FIG. 9 is a diagram showing a table representing an example of a copy broadcast content list for output channel 1;

FIG. 10 is a diagram showing a table representing an example of an apparatus assignment table which is, a table of assignment of output buffer apparatuses to output channels;

FIG. 11 is a diagram showing a table representing an example of an output buffer apparatus storage area control table;

FIGS. 12A, 12B, and 12C show Part (1) of a flowchart representing a detailed process of outputting video and audio signals representing events put on a play list;

FIGS. 13A, 13B, and 13C show Part (2) of the flowchart shown in FIGS. 12A, 12B, and 12C, that is, a continuation flowchart;

FIG. 14 is a diagram showing a typical state of an apparatus assignment table filled up with contents in the event of a failure;

FIG. 15 is a diagram showing a typical state of an output buffer apparatus storage area control table filled up with contents in the event of a failure;

DESCRIPTION OF THE PREFERRED EMBODIMENTS

Figure 3:
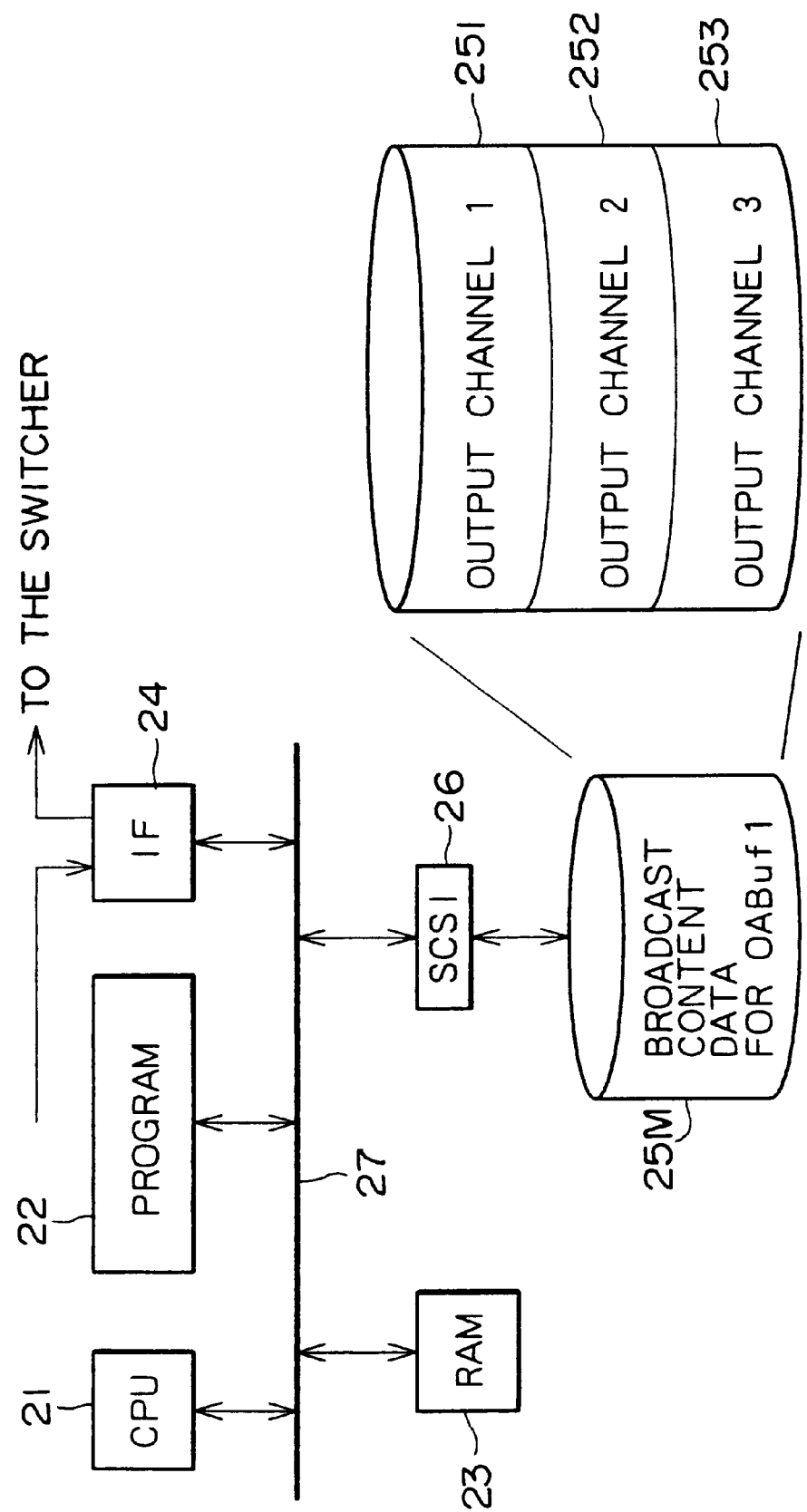
FIG. 3 is a diagram showing the configuration of main output buffer apparatus OB1, OB2 or OB3 in a plain and simple manner.

Some preferred embodiments of the present invention are described below by referring to diagrams. It should be noted, however, that the technological range of the present invention is not limited to the embodiments.

FIG. 1 is a diagram showing the configuration of an embodiment implementing a multichannel broadcasting system provided by the present invention in a simple and plain manner. A control unit 1 employed in the multichannel broadcasting system shown in the figure is typically a group of computers or a mainframe computer connected to the network for controlling the entire system. A broadcast content reproducing machine 2 plays back broadcast contents of CMs and program advertisements for filing work. Broadcast contents played back by the broadcast content reproducing machine 2 are entered and stored in a broadcast content storage apparatus 3 which is typically implemented by a video server having a hard disc or a video card machine having a plurality of video tapes as a recording medium.

In the embodiment shown in FIG. 1, the multichannel broadcasting system comprises 3 output buffer apparatuses OB1, OB2 and OB3 provided for 2 output channels. The output buffer apparatuses OB1 and OB2 each work as a main output buffer apparatus while the output buffer apparatus OB3 functions as a backup output buffer apparatus. Controlled by the control unit 1, the switcher 8 connects the output buffer apparatuses OB1, OB2 and OB3 to the respective output channels.

The output buffer apparatus is typically a small-capacity video server having a hard disc used for storing in advance data such as images and sound of broadcast contents which are to be transmitted at relatively early times according to the transmission order. Then, data of broadcast contents is output to output channels from the main output buffer apparatuses OB1 and OB2 provided for the channels in accordance with a play list created or received by the control unit 1.

Normally, broadcast contents such as CMs are broadcasted repeatedly from time to time through the output channels during a fixed period of time of typically 2 to 3 months. Thus, the broadcast content storage apparatus 3 is provided as an apparatus common to the output buffer apparatuses OB1 to OB3 and used for storing data of broadcast contents shared by the apparatuses OB1 to OB3. Broadcast contents such as CMs to be output to an output channel are copied in advance to an output buffer apparatus associated with the channel.

In the present embodiment, a backup output buffer apparatus OB3 is provided as a backup which is used when the main output buffer apparatuses OB1 and/or OB2 are out of order. Broadcast contents to be output are copied to the main output buffer apparatus OB3. Since the backup output apparatus OB3 is provided as a backup for both the main output buffer apparatuses OB1 and OB2, only part of data of broadcast contents can be stored in the backup output buffer apparatus OB3. For this reason, portions of the data are stored therein in an outputting order with those to be output at relatively early times stored first.

As video and audio signals representing broadcast contents are output from the main output buffer apparatuses OB1 and/or OB2, data of the broadcast contents is deleted from a recording medium, typically a disc, employed in the main output buffer apparatuses OB1 and/or OB2. At the same time, the data is deleted also from the backup output buffer apparatus OB3 as well. In this way, during a normal operation of the main output buffer apparatuses OB1 and OB2, broadcast contents on the play list scheduled for broadcasting are copied to the main output buffer apparatuses OB1 and OB2 as well as the backup output buffer apparatus OB3 and broadcast contents already output are deleted from the main output buffer apparatuses OB1 and OB2 as well as the backup output buffer apparatus OB3. It should be noted, however, that broadcast contents are copied to the backup output buffer apparatus OB3 with those to be output at relatively early times each given a high storing order priority. In addition, all broadcast contents to be stored in a main output buffer apparatus associated with an output channel to be backed up are copied to the backup output buffer apparatus OB3 with those to be output at relatively early times each given a high storing order priority.

When either of the main output buffer apparatuses OB1 and OB2 is out of order, making it impossible to output broadcast contents thereby, a switch employed in a switcher 8 is actuated by the control unit 1 to activate a path shown by a dashed line in the figure. In this new state, broadcast contents such as CMs are output to channel 1 from the backup output buffer apparatus OB3 through the activated path. Once the switcher 8 selects the backup output buffer apparatus OB3 as a substitute for the broken main output buffer apparatus OB1 or OB2, the backup output buffer apparatus OB3 functions as a main output buffer apparatus, allowing data of broadcast contents for channel 1 to be copied to a recording medium employed therein.

As described above, in the embodiment of the present invention, a common backup output buffer apparatus is provided for a plurality of main backup output buffer apparatuses, preventing broadcasting from being suspended even in the event of a failure occurring in any of the main output buffer apparatuses. In addition, by providing backup output buffer apparatuses fewer in number than the main output buffer apparatuses as backups common to the main output buffer apparatuses, that is, by providing at least one backup output buffer apparatus, the number of hardware resources employed in the multichannel broadcasting system can be minimized, allowing the cost to be reduced as well.

In the embodiment shown in FIG. 1, more output channels than those which can be serviced by an output buffer apparatus are assigned to the backup output buffer apparatus. To be more specific, in the embodiment, one output channel is assigned to each of the main output buffer apparatuses OB1 and OB2 but two output channels are assigned to the backup output buffer apparatus OB3. Thus, the number of broadcast contents per output channel that can be stored in the backup output buffer apparatus OB3 is smaller than that in the main output buffer apparatus OB1 or OB2. For this reason, broadcast contents are copied to the backup output buffer apparatus OB3 with those to be output at relatively early times each given a high storing order priority. It implies that the number of copies of broadcast content data stored in the backup output buffer apparatus OB3 is reduced to a minimum.

After broadcast contents such as CMs are output continuously for several minutes, data of a relatively long program is output. While the data of a program is being output, broadcast contents such as remaining CMs can be copied. As a result, by also copying some of broadcast contents to the backup output buffer apparatus OB3, it is possible to cope with a failure that occurs in an emergency.

As the broken output buffer apparatus OB1 is fixed, the apparatus OB1 is thereafter used as a backup while the output buffer apparatuses OB2 and OB3 are each used as a main buffer. That is to say, some data of broadcast contents copied to the output buffer apparatuses OB2 and OB3 is also copied to the backup output buffer apparatus OB1 in the same way as described above in order to cope with a next failure. Thus, the output buffer apparatus OB3 does not always function as a backup. Instead, the three output buffer apparatuses OB1, OB2 and OB3 employed in the embodiment can each serve as a main or a backup buffer.

A basic configuration of the embodiment as a whole has been explained so far. Next, detailed configurations of the control unit 1 and the output buffer apparatuses OB1, OB2 and OB3 are described by referring to, among other diagrams, FIGS. 2 to 4.

FIG. 2A is a diagram showing the overall configuration of a multichannel broadcasting system as implemented by another embodiment shown in FIG. 1, the present embodiment implements a multichannel broadcasting system for 9 output channels. The broadcast content reproducing machine 2 and the broadcast content storage apparatus 3 are identical with those employed in the embodiment shown in FIG. 1. The output buffer apparatuses employed in the present embodiment each support 3 channels. 4 output buffer apparatuses OB1, OB2, OB3 and OB4 are provided for the 9 output channels. The 3 output buffer apparatuses OB1 to OB3 support the 9 output channels whereas to the output buffer apparatus OB4 is used as a backup. As described above, however, there is in actuality no main-to-backup relation among the 4 output buffer apparatuses OB1 to OB4. That is to say, any 3 of them are each used as a main buffer while the remaining one is used as a backup. Also in the present embodiment, the number of backup output buffer apparatuses is smaller than the number of main output buffer apparatuses. In the present embodiment, the switcher 8 simultaneously changes connection of a set of 3 output channels from one output buffer apparatus to another.

Video and audio signals are supplied from the broadcast content reproducing machine 2 to the broadcast content storage apparatus 3 and from the broadcast content storage apparatus 3 to the output buffer apparatuses OB1 to OB4. Then, the video and audio signals are properly supplied from the main output buffer apparatuses OB1 to OB3 to the respective three of output channels 1 to 9 by way of the switcher 8 which is used for simultaneously changing connection of a set of three output channels from one apparatus to another.

The multichannel broadcasting system is further provided with a filing operation terminal 9 and an output operation terminal 10. The terminals 9 and 10 can each be implemented by a personal computer employing its own CPU or by a plain terminal controlled by the control computer system 1. The filing operation terminal 9 is used for example to play back broadcast contents originally supplied by a creator of CMs from the broadcast content reproducing machine 2 and to record and store the content into the broadcast content storage apparatus 3. On the other hand, the output operation terminal 10 is used to output data of broadcast contents recorded and stored in the output buffer apparatuses to their respective output channel as video and audio signals in accordance with a play list. In general, the terminals 9 and 10 are operated by different operators.

As described earlier, the control computer system 1 which serves as a control unit can be implemented by a general purpose computer or a plurality of computers connected to each other by a network. In either case, storage units employed in the control computer system 1 are each implemented by a semiconductor memory or a recording medium such as a magnetic or optical magnetic disc. On the other hand, functions of other elements such as control units, management units and creation units are each implemented by software. Thus, blocks in the control computer system 1 shown in FIGS. 2A and 2B each represent a function implemented by hardware or software.

As shown in FIG. 2B the control computer system 1 comprises a filing control module 101, a filing list control module 102, a filing list creating module 103, a filing list receiving module 104 and a filing list storage unit 105. Their functions and operations carried out at the filing operation terminal 9 allow a large number of broadcast contents such as CMs brought in from an external source to be played back by the broadcast content reproducing machine 2 and recorded and stored in the broadcast content storage apparatus 3.

The control computer system 1 is further provided with a broadcast content data base control module 106 and a broadcast content data base storage unit 107 which is controlled by the broadcast content data base control module 106. The broadcast content data base storage unit 107 is used for storing information on broadcast contents stored in the broadcast content storage apparatus 3.

The control computer system 1 also has an apparatus status control module 108 and an apparatus assignment table storage unit 109. The apparatus status control module 108 controls status of a plurality of output buffer apparatuses as to whether or not the output buffer apparatuses are operating normally, as to which output channels are assigned to each of the output buffer apparatuses and which output buffer apparatus is used as a backup as well as controls free areas in the storage medium employed in each of the output buffer apparatuses by using a control table stored in the apparatus assignment table storage unit 109.

A filing operation terminal control module 110 and an output operation terminal control module 120 control the filing operation terminal 9 and the output operation terminal 10 respectively. An output control module 111 controls an operation to output video and audio signals from an output buffer apparatus to an output channel.

The control computer system 1 further comprises a play list control module 112, a play list creating module 113, a play list receiving module 114 and a play list storage unit 115. A play list is a list containing contents to be output to each output channel. A host control receiving module 116 receives data from a host computer at a level higher than the control computer system 1.

A copy control module 117, a copy management module 118 and a copy list storage unit 119 create a copy broadcast content list showing broadcast contents on a play list which have not been copied to an output buffer apparatus and control an operation to copy data of broadcast contents from the broadcast content storage apparatus 3 to the output buffer apparatuses.

A functional block indicated as a control module in the present embodiment controls mainly hardware such as a device while that indicated as a management module controls mainly information, data and the like. It should be noted, however, that this statement is not always absolutely true.

FIG. 3 is a diagram showing the configuration of the main output buffer apparatus OB1, OB2 or OB3 in a plain and simple manner. As shown in the figure, the output buffer apparatus comprises a CPU 21, a memory unit 22 for storing control programs, a RAM unit 23, an interface unit 24 and a file unit 25M which are connected to a common bus 27. The file unit 25M is connected to the common bus 27 through an SCSI 26. It is desirable to design the file unit 25M into a configuration having redundancy to increase reliability. As described earlier, broadcast contents on a play list for an output channel are stored in a main output buffer apparatus assigned to the output channel. The embodiment shown in FIG. 3 implements the output buffer apparatus OB1 (or the on air buffer OABuf 1) wherein broadcast contents on play lists for typically output channels 1, 2 and 3 are stored.

Figure 4:
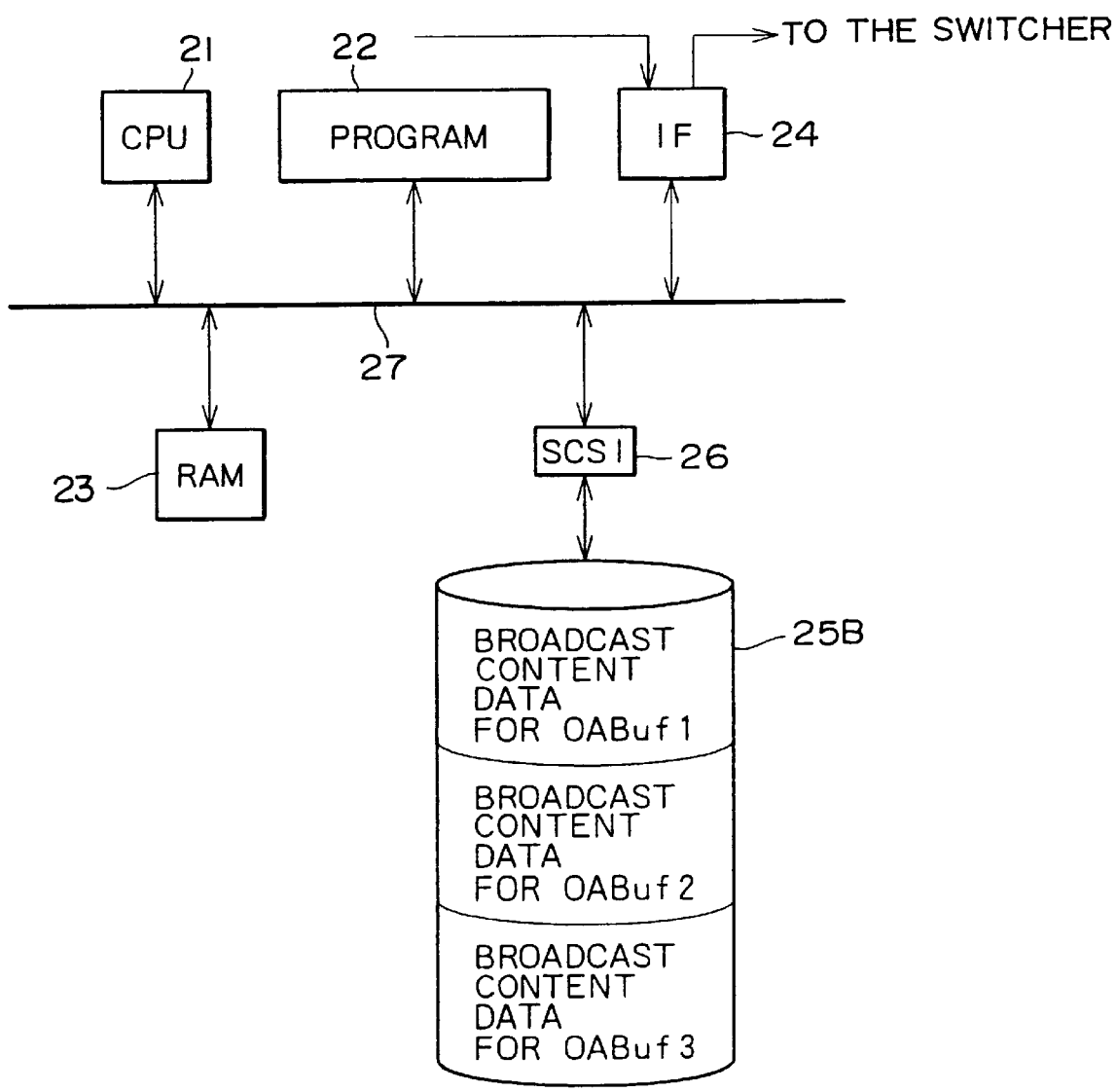
FIG. 4 is a diagram showing the configuration of a backup output buffer apparatus OB4.

FIG. 4 is a diagram showing the configuration of the backup output buffer apparatus OB4. The configuration of the backup output buffer apparatus OB4 is equivalent to that of the main output buffer apparatus OB1, OB2 or OB3 hardwarewise as well as softwarewise. Since the backup output buffer apparatus OB4 functions as a backup, however, the file unit 25B thereof which serves as a recording medium is used for storing only some broadcast contents for play lists for all output channels 1 to 9 with those to be output at relatively early times given high storing order priorities. In the embodiment shown in FIG. 4, the file unit 25B is divided into areas allocated to the output buffer apparatuses OB1, OB2 and OB3 respectively. It should be noted, however, that there is no need to physically divide the file unit 25B into the three areas as long as the file unit 25B is controlled by software as three split areas.

When a main output buffer apparatus is out of order, the backup output buffer apparatus functions as a substitute for the broken one. This means that the four output buffer apparatuses work on an equal footing. Thus, in general, the storage capacities of their file unites are also equal to each other. For this reason, the file unit 25B of the backup output buffer apparatus OB4 contains one-third of the data of broadcast contents stored in each of the main output buffer apparatuses OB1 to OB3 with those to be output at relatively early times given high storing order priorities. It should be noted, however, that the backup output buffer apparatus OB4 can be provided with a file unit 25B having a storage capacity larger than each of those of the main output buffer apparatuses OB1 to OB3.

Figure 5:
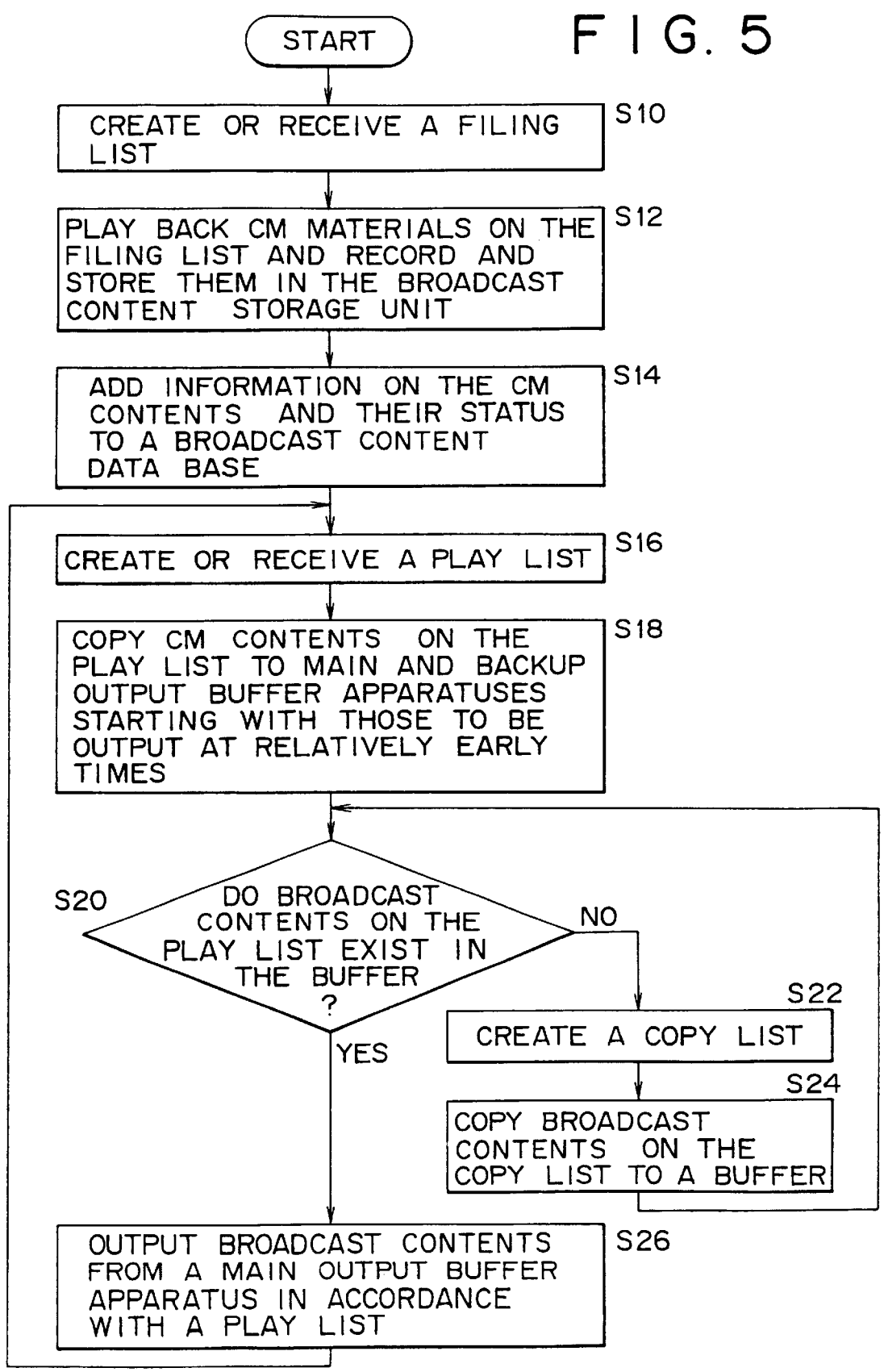
FIG. 5 is a flowchart representing pieces of processing carried out in the multichannel broadcasting system shown in FIG. 2, from an operation to record broadcast contents to an operation to output them, in a simple and plain manner.
Figure 12B:
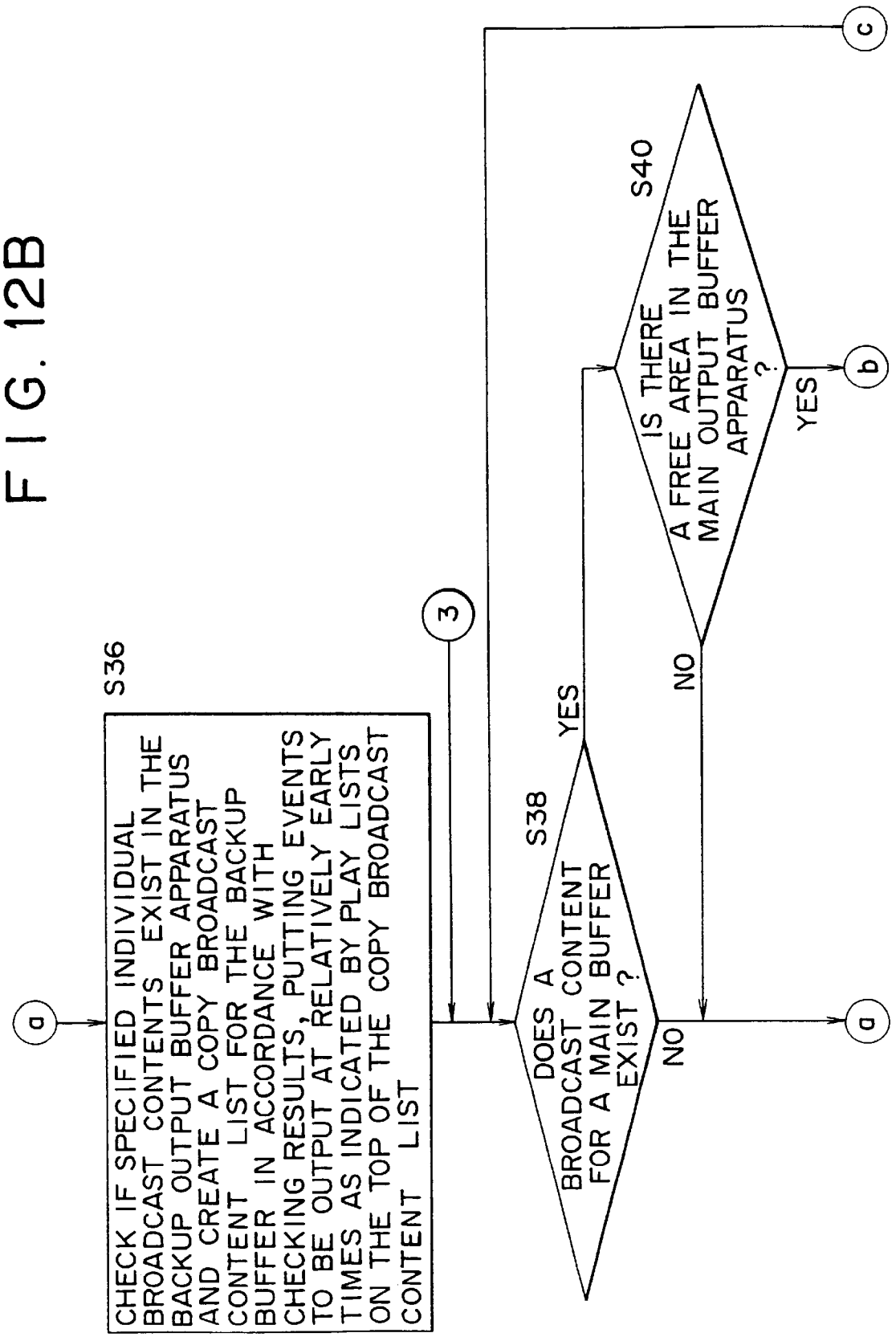
Figure 12C:
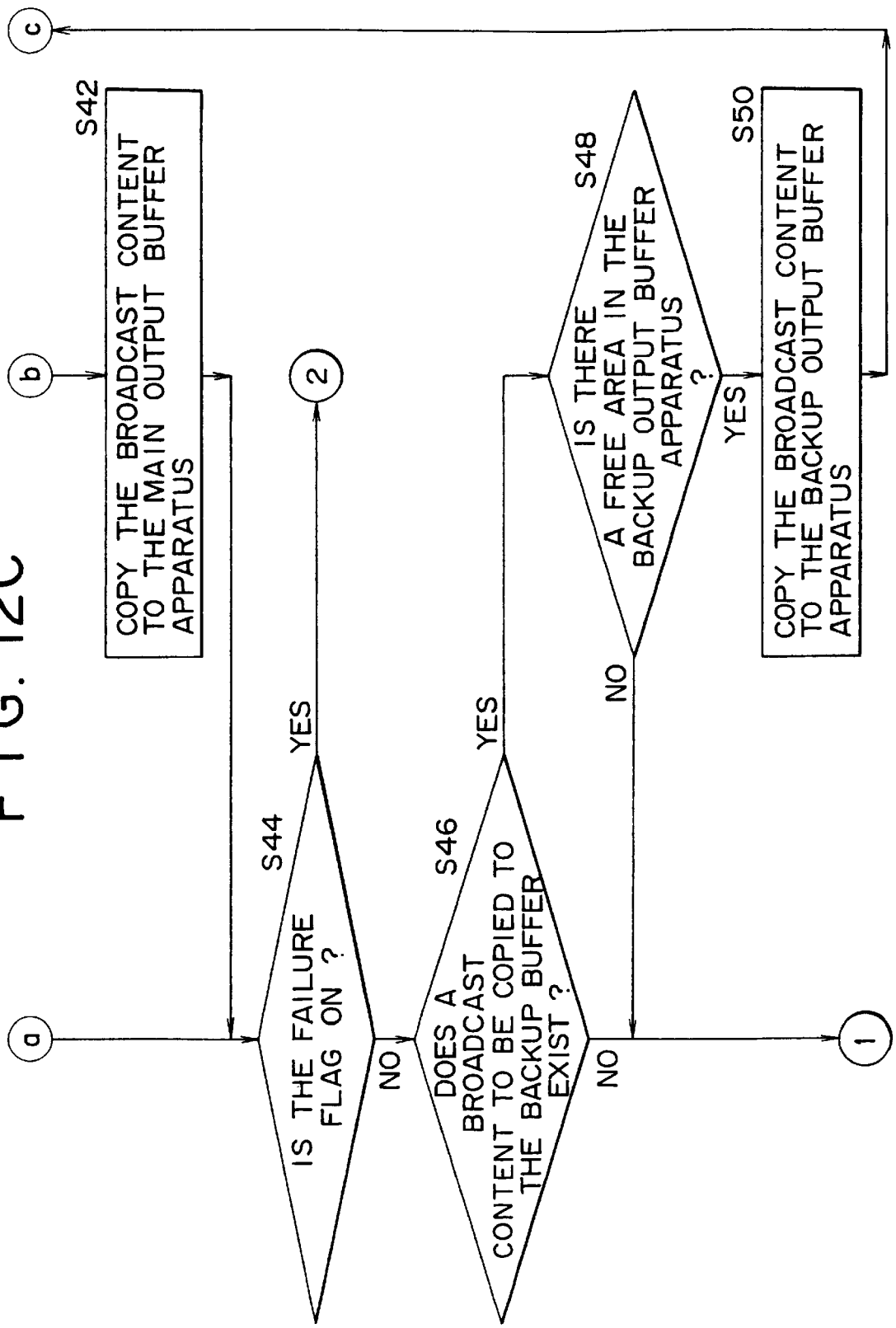

FIG. 5 is a flowchart representing pieces of processing carried out in the multichannel broadcasting system shown in FIG. 2, from an operation to record broadcast contents to an operation to output them, in a simple and plain manner. It should be noted, however, that a process carried out in the event of a failure occurring in a main output buffer apparatus is omitted from the flowchart.

As shown in the figure, the flowchart begins with a step S10 at which a filing list is created or received. A broadcast content supplied from an external source is played back by the broadcast content reproducing machine 2 and stored in the broadcast content storage unit 3 in accordance with the filing list. The filing list is entered by the operator via the filing operation terminal 9 or received from a computer at a higher level not shown in the figure. In the case of a created filing list, the filing operation terminal control module 110 controls the filing operation terminal 9, passing on a command entered by the operator to the filing list creating module 103 which then carries out processing to create the filing list. The created filing list is stored in the filing list storage unit 105 by the filing list control module 102. In the case of a received filing list, on the other hand, the filing list is received by the filing list receiving module 104 and stored in the filing list storage unit 105 by the filing list control module 102.

After the filing list is stored in the filing list storage unit 105, the operator does filing work of broadcast contents by using the filing list. To put it concretely, at a step S12, the filing list control module 102 extracts a filing list which is used as a base by the filing control module 101 to play back a broadcast content from the broadcast content reproducing machine 2 and store the content into the broadcast content storage unit 3.

FIG. 6 is a diagram showing a table representing an example of a filing list in concrete terms. As shown in the figure, each entry on the filing list is attribute data of a broadcast content including the identification code of the broadcast content, the length of the broadcast content, the name of the broadcast content, a date up to which the broadcast content is to be output and a sponsor providing financial support for the broadcast content.

When data of a broadcast content is stored in the broadcast content storage unit 3, at a step S14, information on the data and status of the data are added and stored to the broadcast content data base storage unit 107 by the broadcast content data base control module 106. FIG. 7 is a diagram showing tables representing an example of a broadcast content data base in concrete terms. As shown in the figure, the data base includes an entry of each broadcast content like the one cataloged on the filing list shown in FIG. 6. The entry includes status which indicates whether or not the broadcast content has been stored (filed) in the broadcast content storage unit 3. The status is linked to attribute data which includes a flag indicating whether or not the broadcast content has been copied to the 3 main output buffer apparatuses OABUF1 to OABUF3, a flag indicating whether or not the broadcast content has been output, an output frequency level and a date and a time at which the broadcast content was output last. The attribute data is stored in an area at the end of the link to the status in the entry and is pointed to by a pointer.

When a broadcast content is played back by the broadcast content reproducing machine 2 and stored in the broadcast content storage unit 3, an operation to record the status of the broadcast content in the broadcast content data base is also completed as well. After verifying that the storing of the broadcast content has been done normally, that is, the filing work has been completed, the operator sets data indicating that the filing has been completed in the status field of the entry of the broadcast content in the data base.

Then, preparations for outputting a broadcast content are carried out. The operator in charge of broadcast content outputting operations prepares a play list for each of output channels 1 to 9. The play list is entered by the operator via the output operation terminal 10 or received from a computer at a higher level not shown in the figure at a step S16. In the case of a created play list, commands entered by the operator via the output operation terminal 10 which is controlled by the output operation terminal control module 120 are supplied to the play list creating module 113. A play list is then created by the play list creating module 113 and stored in the play list storage unit 115 by the play list control module 112. In the case of a received play list, on the other hand, the play list is received by the play list receiving module 114 from a computer at a higher level not shown in the figure as described above and stored in the play list storage unit 115.

FIG. 8 is a diagram showing a table representing an example of a play list. In particular, the figure shows an example of a play list for output channel 1. As shown in the figure, each line on the list includes attribute data such as an outputting date and time, a program identification code, a title, an outputting duration and a broadcast content identification code. The line is referred to as an event. Events are arranged on the list in a chronological order of the outputting date and time.

When a play list for an output channel is received or created, data of broadcast contents is copied from the broadcast content storage unit 3 to the main output buffer apparatus OB1, OB2 or OB3 associated with the output channel with a broadcast content to be displayed at a relatively early time given a high storing order priority in accordance with the play list at a step S18. At the same time, the data of the broadcast content is copied also to the backup output buffer apparatus OB4. A main output buffer apparatus to which an output channel is assigned can be identified by referring to an apparatus assignment table stored in the apparatus assignment table storage unit 109.

The processing to copy data of broadcast contents at the step S18 is implemented by concrete operations carried out at steps S20, S22 and S24. To put it in detail, at the step S20, the play list control module 112 makes an inquiry to the broadcast content data base control module 106 about whether or not a broadcast content specified in the play list for an output channel already exists in a main output buffer apparatus assigned to the output channel. As shown in FIG. 7, the broadcast content data base includes attribute data stored in an area at the end of the link to each broadcast content entry. The attribute data includes a flag indicating whether or not the broadcast content has been copied to the output buffer apparatus. By referring to this flag, the broadcast content data base control module 106 is thus capable of answering the inquiry made by the play list control module 112. If the broadcast content has not been copied to the output buffer apparatus yet, a copy request is issued to the copy management module 118.

At a step S22, the copy management module 118 sets a copying sequence in accordance with the outputting date—time order in order to create a copy broadcast content list, which is then stored in the copy storage unit 119, at the copy request made by the play list control module 112. FIG. 9 is a diagram showing a table representing an example of a copy broadcast content list for output channel 1. Each entry in the table represents a broadcast content, comprising the identification code of the broadcast content, the name of the broadcast content, the output channel for outputting the broadcast content, the date and time at which the broadcast content is to be output and the number of the output buffer apparatus to which the broadcast content is to be copied. A broadcast content on the play list which has not been stored yet in an output buffer apparatus assigned to the output channel is put on the copy broadcast content list.

In the creation of a copy broadcast content list, assignment data indicating which output channels are supported by an output buffer apparatus is required. FIG. 10 is a diagram showing an example of an apparatus assignment table, a table of assignment of output buffer apparatuses to output channels. It is obvious from the figure that the table indicates a relation associating the output channels with the main and backup output buffer apparatuses. Each entry in the table also includes a flag indicating whether the output buffer apparatus is normal or out of order as attribute data. This point will be described more later. This apparatus assignment table is created by the apparatus status control module 108 and stored in the apparatus assignment table storage unit 109.

After the copy broadcast content list for the output channel has been created, the copy management module 118 passes on the request to copy broadcast contents based on the copy broadcast content list to the copy control module 117. At a step S24, the copy control module 117 copies the broadcast contents on the copy broadcast content list from the broadcast content storage unit 3 to an output buffer apparatus specified by the list. As the operation to copy the broadcast contents is completed, the copy management module 118 notifies the broadcast content data base control module 106 of the copy completion which is then reflected thereby in the broadcast content data base. To put it in detail, a flag indicating whether or not a broadcast content exists in an output buffer apparatus in each relevant attribute data stored in an area at the end of a link of the table shown in FIG. 7 is set accordingly.

In addition, before a broadcast content is copied to an output buffer apparatus, the copy management module 118 checks whether or not an area with a sufficient size is available in a recording medium employed in the output buffer apparatus as a file unit. If an area with a sufficient size is not available, the broadcast content to be copied is kept waiting till such an area is made available by deletion of broadcast contents which were previously stored in the recording medium but have been already output, hence, being no longer required. Free areas in a recording medium employed in an output buffer apparatus are controlled by an output buffer apparatus storage area control table stored in the copy list storage unit 119.

FIG. 11 is a diagram showing a table representing an example of the output buffer apparatus storage area control table. As shown in the figure, associated with an output channel, each entry of the output buffer apparatus storage area control table includes data indicating the capacity of the recording medium employed in the main output buffer apparatus assigned to the output channel and the size of used areas in the recording medium. In place of the data indicating the size of used areas, data indicating the size of free areas can be included. The copy management module 118 controls the state of free areas by updating the output buffer apparatus storage area control table. As shown in FIG. 3, the file unit 25M in the main output buffer apparatus is divided into as many areas 251, 252 and 253 as output channels supported by the main buffer apparatus. The areas 251, 252 and 253 are allocated to the output channels. The output buffer apparatus storage area control table also includes data indicating the capacity of the recording medium employed in the backup output buffer apparatus and the size of used areas in the recording medium. In the case of the embodiments shown in FIGS. 2 and 4, the file unit 25B of the backup output buffer apparatus is used for storing broadcast contents copied to the 3 main output buffer apparatuses. Thus, in the embodiments, data of broadcast contents is copied to the file unit 25B with those to be output at relatively early times given high storing order priorities as indicated by the play lists of output channels 1 to 9 as shown in the output buffer apparatus storage area control table of FIG. 11. It is obvious from the figure that the capacity of the recording medium employed in the backup output buffer apparatus allocated to a channel is smaller than the capacity of the recording medium employed in the main output buffer apparatus allocated to the same channel.

After data of broadcast contents has been copied to the file units of the output buffer apparatuses with those to be output at relatively early times given high storing order priorities as indicated by the play lists, the broadcast contents are output to the respective output channels in accordance with the play lists at output times specified on the play lists at a step S26. To put it concretely, the play list control module 112 extracts events from a play list for an output channel which is then used by the output control module 111 as a base for controlling an output buffer apparatus supporting the output channel and the switcher 8 to carry out an operation to output a broadcast content from the output buffer apparatus to the output channel. A request to output a broadcast content is typically made by the operator by operating the output operation terminal 10 or made by an output control signal received by the host control receiving module 116 from a computer at a higher level.

As the processing to output broadcast contents is completed, the play list control module 112 supplies information indicating the completion of the broadcast content outputting operation to the copy control module 117 which then makes a request for deletion of the data of the broadcast content from the file unit of the output buffer apparatus.

So far, a flow of operations carried out by the functional blocks of the control computer system 1 to output broadcast contents has been explained. Next, a detailed process of outputting video and audio signals representing events put on a play list is described by referring to FIGS. 12A, 12B, 12C, and 13A, 13B, 13C which show a detailed flowchart representing the process.

As shown in FIGS. 12A, the flowchart begins with a step S30 which is executed when the multichannel broadcasting system is activated. At the step S30, the apparatus status control module 108 sets the apparatus number of a main output buffer apparatus associated with each output channel and the apparatus number of a backup output buffer apparatus assigned to the output channel in the apparatus assignment table. In the case of the present embodiment, for example, output channels 1 to 3, 4 to 6 and 7 to 9 are associated with the main output buffer apparatuses OB1, OB2 and OB3 respectively. As for the backup, the output buffer apparatus OB4 is assigned to all output channels 1 to 9. FIG. 10 is the diagram showing an apparatus assignment table created to record such assignments. As shown in the figure, a failure flag of each entry in the apparatus assignment table is set to OFF.

Typically, the four output buffer apparatuses OB1 to OB4 are assigned to output channels 1 to 9 on an equal footing. If the capacities of the file units employed in the output buffer apparatuses OB1 to OB4 are equal to each other, the 4 output buffer apparatuses OB1 to OB4 can be initially assigned to output channels 1 to 9 arbitrarily as main buffers and a backup buffer. If one of the output buffer apparatuses OB1 to OB4 is designed with a file unit different from those of the rest, that is, with a file unit prepared specially for a backup, on the other hand, the specially designed output buffer apparatus is chosen as a backup while the remaining three are used as main buffers.

The flowchart then goes on to a step S32 to enter a state waiting for the operator to carry out an operation to create a play list or a host computer at a higher level not shown in the figure to transmit a play list.

When a play list like the one shown in FIG. 8 is created or received, the play list control module 112 checks whether or not broadcast contents, which are cataloged on the play list in a chronological order with those to be output at relatively early times put first, have already been stored in the recording mediums of the respective main output buffer apparatuses OB1 to OB3 starting with the event of the broadcast content on the top of the list. If a broadcast content has not been stored yet, a copy request is issued to the copy management module 118. In actuality, whether or not a broadcast content has already been stored in the recording medium of its output buffer apparatus is checked by the broadcast content data base control module 106 by referring to the broadcast content data base shown in FIG. 7. At a step S34, the copy management module 118 creates a copy broadcast content list like the one shown in FIG. 9 including broadcast contents to be copied to the main output buffer apparatus with the contents put on the list in a chronological order of the outputting data and time. The copy broadcast content list is then stored in the copy list storage unit 119. The copy broadcast content list is created for each output channel.

By the same token, the play list control module 112 checks whether or not broadcast contents, which are cataloged on the play list in a chronological order with those to be output at relatively early times put first, have already been stored in the recording medium of the backup output buffer apparatus OB4 starting with relatively early time events of broadcast contents on the top of the list. If a broadcast content has not been stored yet, a copy request is issued to the copy management module 118. At a step S36, the copy management module 118 creates a copy broadcast content list like the one shown in FIG. 9 including broadcast contents to be copied to the backup output buffer apparatus OB4 by following the same procedure as the copy broadcast content list for a main buffer. The copy broadcast content list is then stored in the copy list storage unit 119.

A broadcast content put on the copy broadcast content list for a main buffer is copied to its main output buffer apparatus OB1, OB2 or OB3 at steps S38 to S42. To be more specific, at a step S38, the copy management module 118 forms a judgment as to whether or not there is an event of a broadcast content to be copied is on the copy broadcast content list for a main buffer. If the outcome of the judgment formed at the step S38 indicates that there is an event of a broadcast content to be copied left on the copy broadcast content list, the flow of processing continues to a step S40 at which the copy management module 118 forms a judgment as to whether or not a free area for storing a copied broadcast content exists in the recording medium employed in the main output buffer apparatus. The judgment is formed at the step S40 by referring to the output buffer apparatus storage area control table stored in the copy list storage unit 119 like the one shown in FIG. 11.

If the outcome of the judgment formed at the step S40 indicates that a free area is available in the recording medium employed in the main output buffer apparatus, the flow of processing proceeds to a step S42 at which the copy management module 118 makes a request to the copy control module 117 to copy the broadcast content, the event of which is left on the copy broadcast content list to the free area. Then, the copy control module 117 copies the broadcast content from the broadcast content storage unit 3 to the main output buffer apparatus. After the copy operation is completed, the copy management module 118 deletes the event of the copied broadcast content from the copy broadcast content list. Then, data indicating the size of free areas or used areas in the output buffer apparatus storage area control table stored in the copy list storage unit 119 is updated.

A broadcast content put on the copy broadcast content list for the backup buffer is copied to the backup output buffer apparatus OB4 at steps S46 to S50. However, the operation to copy a,broadcast content to the backup output buffer apparatus OB4 is not carried out when the apparatus OB4 is out of order as evidence by an ON state of a failure flag included in the apparatus assignment table. In the present embodiment, there is only one backup output buffer apparatus. Thus, when the backup output buffer apparatus is used as a substitute for. a broken main output buffer apparatus, the backup is no longer available till the broken main apparatus is fixed. For this reason, at a step S44, the failure flag is examined to determine whether the state thereof is ON or OFF. If the failure flag is ON, the flow of processing goes on to a step S66 of the continuation flowchart shown in FIG. 13.

The processing to copy a broadcast content put on the copy broadcast content list for the backup buffer to the backup output buffer apparatus OB4 starts with a step S46 at which the copy management module 118 forms a judgment as to whether or not there is an event of a broadcast content to be copied left on the copy broadcast content list for a backup buffer. If the outcome of the judgment formed at the step S46 indicates that there is an event of a broadcast content to be copied left on the copy broadcast content list, the flow of processing continues to a step S48 at which the copy management module 118 forms a judgment as to whether or not a free area for storing a copied broadcast content exists in the recording medium employed in the backup output buffer apparatus OB4. The judgment is formed at the step S48 by referring to the output buffer apparatus storage area control table stored in the copy list storage unit 119.

If the outcome of the judgment formed at the step S48 indicates that a free area is available in the recording medium employed in the main output buffer apparatus, the flow of processing proceeds to a step S50 at which the copy management module 118 makes a request to the copy control module 117 to copy the broadcast content, the event of which is left on the copy broadcast content list to the free area. Then, the copy control module 117 copies the broadcast content from the broadcast content storage unit 3 to the backup output buffer apparatus OB4. After the copy operation is completed, the copy management module 118 deletes the event of the copied broadcast content from the copy broadcast content list. Then, data indicating the size of free areas or used areas in the output buffer apparatus storage area control table stored in the copy list storage unit 119 is updated. As described earlier, a broadcast content with the earliest event is selected among broadcast contents to be copied to the recording medium of a main output buffer apparatus being backed up and is copied to the free area of the recording medium of the backup output buffer apparatus OB4.

If a free area is found unavailable in the file units of the main and backup output buffer apparatuses or no more event of a broadcast content to be copied is found left in the copy broadcast content lists for the main and backup buffers during the processing carried out at the steps S38 to S50, the flow of processing goes on to a junction point No. 1, that is, a step S52 of the continuation flowchart shown in FIG. 13A.

At the step S52, the apparatus status control module 108 checks whether the state of the failure flag in the apparatus assignment table is ON or OFF. If the state of the failure flag is OFF, the flow of the processing proceeds to a step S54 at which the apparatus status control module 108 forms a judgment as to whether or not the main output buffer apparatus is out of order. Under a normal condition, the main output buffer apparatus operates normally and the state of the failure flag is initially cleared to OFF. As a result, the flow of processing goes on from the step S52 to a step S66 by way of the step S54, by-passing steps S56, S58, S60, S62 and S64. At the step S66 of FIG. 13B, the play list control module 112 enters a state waiting for the occurrence of an event of an outputting time in the play list. In the waiting state, the flow of processing returns to the step S52 to carry out the processing of forming a judgment as to whether or not the main output buffer apparatus is out or order repeatedly.

If the outcome of the judgment formed at the step S54 by the apparatus status control module 108 indicates that the main output buffer apparatus is out of order, the backup output buffer apparatus OB4 is switched in to replace the main output buffer apparatus which is out of order at steps S56 and S58. To put it concretely, the backup output buffer apparatus OB4 (OABUF4) is assigned to output channels so far supported by the main output buffer apparatus OB1 provided that it is the main output buffer apparatus OB1 which is out of order. To be more specific, the backup output buffer apparatus OB4 (OABUF4) is assigned as a replacement to output channels 1, 2 and 3 as shown in the apparatus assignment table of FIG. 14 in the event of such a failure. At the same time, the contents of a column of the apparatus assignment table shown in FIG. 14 as a cell enclosed by a double line are cleared.

After the apparatus assignment has been changed as described above, the apparatus status control module 108 notifies the output control module 111, the play list control module 112, the copy control module 117 and the copy management module 118 of the fact that the output buffer apparatus assigned to output channels 1, 2 and 3 has been changed. Notified of the change in apparatus assignment, the output control module 111, the play list control module 112, the copy control module 117 and the copy management module 118 recognize the fact that the assignment of the main output buffer apparatus has been changed, treating the newly assigned output buffer apparatus OB4 as a control object. In addition, the copy management module 118 properly updates data stored in the output buffer apparatus storage area control table. FIG. 15 is a diagram showing a typical state of the output buffer apparatus storage area control table filled up with contents in the event of a failure. As indicated by cells each enclosed by a double line in the output buffer apparatus storage area control table, the output buffer apparatus OB4 (OABUF4) is assigned to output channels 1, 2 and 3 as a main output buffer apparatus. The sizes of used areas right before the replacement of the main output buffer apparatus, that is, 15 minutes, 14 minutes and 17 minutes, are written into the area of one of the cells. At the same time, the contents of a column of the backup output buffer apparatus shown in the figure as a cell enclosed by a double line are cleared at the step S56.

Then, at the step S58, the apparatus status control module 108 sets the state of the failure flag in the apparatus assignment table to ON to indicate that the main output buffer apparatus is out of order, ending the operation to switch from the main output buffer apparatus to the backup output buffer apparatus OB4 in the event of a failure occurring in the former. Thereafter, the output buffer apparatus OB4 operates as a main buffer.

When it is time to output a broadcast content as indicated by an event in the play list, the play list control module 112 notifies the output control module 111 of the event of the play list including the broadcast content to be output. The output control module 111 controls the output buffer apparatus OB assigned to an output channel associated with the play list and the switcher 8, outputting video and audio signals to the output channel at a step S68.

As the output operation is completed, the flow of processing goes on to a step S70 at which the copy control module 117 deletes the output broadcast content from the file unit employed in the main output buffer apparatus. Then, the copy control module 117 updates data representing the size of used or free areas included in the output buffer apparatus storage area control table stored in the copy list storage unit 119.

Accompanying the completion of the output operation, at a step S72 of FIG. 13C, the copy management module 118 checks whether the failure flag is ON or OFF through the apparatus status control module 108. Under a normal condition, the failure flag is OFF. In this case, the flow of processing goes on to a step S74 at which the output broadcast content is deleted by the copy control module 117 from the file unit employed in the backup output buffer apparatus. At the same time, the copy control module 117 updates data representing the size of used or free areas of the backup output buffer apparatus included in the output buffer apparatus storage area control table of FIG. 11 stored in the copy list storage unit 119. If the failure flag is ON, on the other hand, the processing of the step S74 is not carried out.

The flow of processing then proceeds to a step S76 to form a judgment as to whether or not all events on the play list have been output. If the outcome of the judgment indicates that not all events on the play list have been output, the process described so far is carried out again till all events on the play list are output.

In the event of a failure occurring in a main output buffer apparatus, the backup output buffer apparatus is reassigned to output channels supported so far by the main output buffer apparatus which is out of order. Thereafter, the backup output buffer apparatus functions as a main buffer. Thus, in the case of the embodiment shown in FIG. 2, in the event of a failure, the backup output buffer apparatus no longer exists. In the absence of a backup output buffer apparatus, operations to copy a broadcast content to the backup output buffer apparatus and to delete an output broadcast content from it are not carried out.

In the event of a failure occurring in a main output buffer apparatus as evidenced by an ON state of the failure flag detected at the step S52, the flow of processing goes on to a step S60 to form a judgment as to whether or not the broken output buffer apparatus has been fixed. As soon as the broken output buffer apparatus is fixed, the flow of processing goes on to a step S62 at which the fixed apparatus is cataloged as a backup. Thereafter, operations to copy a broadcast content to the backup output buffer apparatus and to delete an output broadcast content from it are carried out.

To put it in detail, when the broken output buffer apparatus is fixed, at the step S62, the apparatus status control module 108 catalogs the fixed apparatus in a column for the backup output buffer apparatus of the apparatus assignment table shown in FIGS. 10 and 14 as a backup. At the same time, the fixed apparatus is also cataloged in a column for the backup output buffer apparatus of the output buffer apparatus storage area control table shown in FIGS. 11 and 15. The flow of processing then continues to a step S64 at which the apparatus status control module 108 turns off the failure flag in the apparatus assignment table. Thereafter, a sequence of operations are carried out by assuming that a backup output buffer apparatus exists.

As described above, in the present embodiment, four output buffer apparatuses operate as main buffers or a backup on an equal footing. The backup output buffer apparatus is switched to a main output buffer apparatus and a recovered main apparatus is cataloged as a backup by merely updating data in the apparatus assignment table and the output buffer apparatus storage area control table and switching the state of the switcher 8. As a result, it is not necessary for the control computer system 1 to have a special backup function. In addition, it is not necessary to provide a special output buffer apparatus serving as a backup.

Figure 16A:
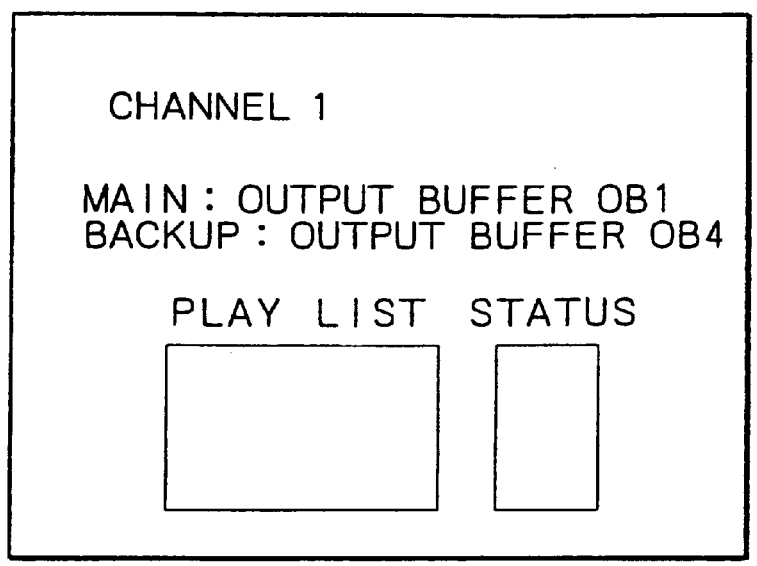
FIG. 16 is a diagram showing examples of screens which are displayed on the output operation terminal 10 when the output buffer apparatuses function normally.
Figure 16B:
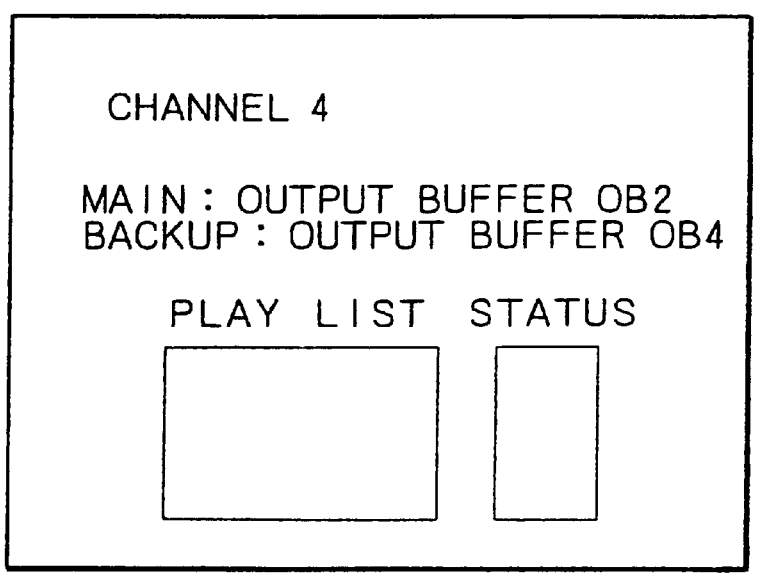

FIG. 16 is a diagram showing examples of screens which are displayed on the output operation terminal 10 when the output buffer apparatuses function normally. In a multichannel broadcasting system with 9 output channels as is the case with the embodiment shown in FIG. 2, nine screens for the nine output channels respectively are generally displayed. On each of the screens, a play list of the output channel and status of events on the play list such as "already output", "being output" and "not output yet" are displayed. FIG. 16A shows an example of a screen for output channel 1 supported by the main output buffer apparatus OB1 and FIG. 16B shows an example of a screen for output channel 4 supported by the main output buffer apparatus OB2. On each of the screen, the number of the main output buffer apparatus supporting the output channel and the number of the backup output buffer apparatus are also displayed. To be more specific, on the screen shown in FIG. 16A, the following apparatus numbers are displayed: "Main: Output buffer OB1" and "Backup: Output buffer OB4". On the screen shown in FIG. 16B, on the other hand, the following apparatus numbers are displayed: "Main: Output buffer OB2" and "Backup: Output buffer OB4". It is thus obvious that the main output buffer apparatuses OB1 and OB2 share the backup output buffer apparatus OB4.

Figure 17A:
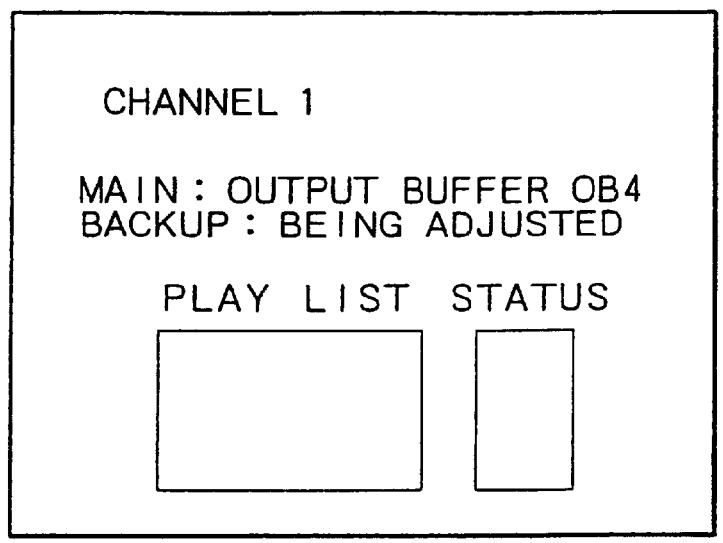
FIG. 17 is a diagram showing examples of screens which are displayed on the output operation terminal 10 in the event of a failure occurring in a main output buffer apparatus.
Figure 17B:
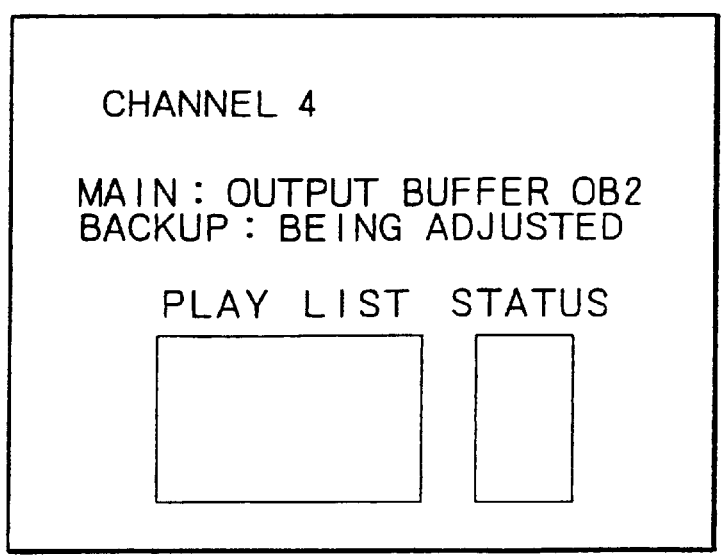

FIG. 17 is a diagram showing examples of screens which are displayed on the output operation terminal 10 in the event of a failure occurring in a main output buffer apparatus. In this case, a message typically stating "A backup output buffer apparatus is being adjusted" is displayed on the screen to notify the user that the backup output buffer apparatus is not available currently. This time, the backup output buffer apparatus OB4 declared as a backup on the screen shown in FIG. 16 is used as a substitute for the main output buffer apparatus in which the failure has occurred.

In the embodiment described above, only one backup output buffer apparatus is provided. It should be noted, however, that a plurality of backup output buffer apparatuses, typically fewer in number than main output buffer apparatuses, can be provided. In this case, each of the backup output buffer apparatuses is assigned to more output channels than those associated with a main output buffer apparatus. As a result, the number of broadcast contents per output channel stored in the file unit employed in a backup output buffer apparatus is smaller than that stored in the file unit employed in a main output buffer apparatus.

As an alternative, in a multichannel broadcasting system provided with a plurality of backup output buffer apparatuses, output channels are assigned to all the backup output buffer apparatuses by distributing equally to the apparatuses when all main output buffer apparatuses function normally. Should one of the main output buffer apparatuses be out of order, a backup output buffer apparatus is used as its replacement and the output channels are newly assigned to all the remaining backup output buffer apparatuses by again redistributing equally to the apparatuses. At any rate, the scope of the present invention is not limited to a multichannel broadcasting system with a single backup output buffer apparatus.

As described above, in a multichannel broadcasting system provided by the present invention wherein a plurality of main output buffer apparatuses are assigned to output channels, a minimum number of backup output buffer apparatuses are provided and broadcast contents to be output are copied to both the main and backup output buffer apparatuses. As a result, a backup output buffer apparatus can be used as a substitute for a main output buffer apparatus in case the main output buffer apparatus is out of order without the need to suspend the broadcasting.

In this case, by using fewer backup output buffer apparatuses than main backup output buffer apparatuses, the backup cost can be relatively reduced. In addition, by copying only data of broadcast contents for relatively early time events on a play list to the file unit of a backup output buffer apparatus, the backup output buffer apparatus can be used as a substitute for a main output buffer apparatus in case the main output buffer apparatus is out of order without the need to suspend the broadcasting.

Furthermore, a minimum number of backup output buffer apparatuses are merely added to main output buffer apparatuses. As a result, the processing to copy broadcast contents from the broadcast content storage unit to the output buffer apparatuses does not require that much additional time and work.

What is claimed is:

1. A multichannel broadcasting system for outputting a plurality of broadcast contents to a plurality of output channels comprising:

a storage unit for supplying said plurality of broadcast contents;

a plurality of main output buffer apparatuses corresponding to said plurality of output channels, respectively, for storing said plurality of broadcast contents and for transmitting the stored broadcast contents to the corresponding output channels in accordance with a predetermined transmission order;

means for assigning a priority order to said broadcast contents to be transmitted to said plurality of output channels on the basis of said predetermined transmission order;

a backup output buffer apparatus for storing said broadcast contents from said storage unit based on said priority order prior to the transmission of said broadcast contents from said main output buffer apparatuses to said corresponding output channels; and a control unit for controlling said backup output buffer apparatus so that said backup output buffer apparatus transmits said broadcast contents stored therein to an output channel of a failed main output buffer apparatus instead of said broadcast contents stored in said failed main output buffer apparatus when said failed main output buffer apparatus fails, wherein in the event of a failure occurring in any of said plurality of main output buffer apparatuses, said control unit assigns said backup output buffer apparatus as a main output buffer apparatus to said output channel corresponding to said failed main output buffer apparatus; and thereafter, signals of broadcast contents to be transmitted to said corresponding output channel corresponding to said failed main output buffer apparatus are copied from said storage unit to said backup output buffer apparatus, and when said failed main output buffer apparatus is fixed, said control unit catalogs said fixed failed main output buffer apparatus as said backup output buffer apparatus; and broadcast contents to be transmitted to said plurality of output channels are copied from said storage unit to said fixed failed main output buffer apparatus cataloged as said backup output buffer apparatus based on said priority order.

2. A multichannel broadcasting system for outputting a plurality of broadcast contents to a plurality of output channels, comprising:

a storage unit for supplying said broadcast contents;

a plurality of output buffer apparatuses wherein a number of said plurality of output buffer apparatuses is greater than a number of output buffer apparatuses required for assignment to said plurality of output channels; and a control unit for causing broadcast contents to be copied from said storage unit to said output buffer apparatuses and transmitted from said output buffer apparatuses to respective output channels corresponding with said output buffer apparatuses on the basis of a predetermined transmission order, wherein:

said control unit assigns some of said output buffer apparatuses to correspond to a respective plurality of said output channels as main output buffer apparatuses and remaining output buffer apparatuses respectively to all of said plurality of output channels as backup output buffer apparatuses;

broadcast contents to be transmitted to any of said plurality of output channels are stored in said a main output buffer apparatus corresponding to said output channel;

a priority order of the broadcast contents is determined based on the predetermined transmission order; and broadcast contents to be transmitted to all of said plurality of output channels are stored in each of said backup output apparatuses based on the priority order of the broadcast contents; and in the event of a failure occurring in any of said main output buffer apparatuses, said control unit assigns one of said backup output buffer apparatuses as a main output buffer apparatus for output channels associated with said main output buffer apparatus in which said failure occurred, wherein said control unit has an apparatus assignment table for associating some of said output buffer apparatuses with a respective plurality of said output channels as a main output buffer apparatus and remaining output buffer apparatuses with a respective plurality of said output channels as a backup output buffer apparatus; and signals of broadcast contents are copied from said storage unit to respective ones of said output buffer apparatuses in accordance with said apparatus assignment table.

* * * * *